US012636136B2

(12) United States Patent
Zhou et al.

(10) Patent No.: US 12,636,136 B2
(45) Date of Patent: May 26, 2026

(54) ORAL CARE IMPLEMENT AND REFILL HEAD THEREOF

(71) Applicant: Colgate-Palmolive Company, New York, NY (US)

(72) Inventors: Jiang Zhou, Yangzhou City (CN); Yanmei Ji, Jiangsu (CN); Wen Jin Xi, Shanghai (CN)

(73) Assignee: Colgate-Palmolive Company, New York, NY (US)

( * ) Notice: Subject to any disclaimer, the term of this patent is extended or adjusted under 35 U.S.C. 154(b) by 731 days.

(21) Appl. No.: 17/919,625

(22) PCT Filed: Apr. 30, 2020

(86) PCT No.: PCT/CN2020/087935
§ 371 (c)(1),
(2) Date: Oct. 18, 2022

(87) PCT Pub. No.: WO2021/217535
PCT Pub. Date: Nov. 4, 2021

(65) Prior Publication Data
US 2023/0149140 A1 May 18, 2023

(51) Int. Cl.
*A61C 17/22* (2006.01)
*A46B 5/00* (2006.01)
*A46B 15/00* (2006.01)

(52) U.S. Cl.
CPC .......... *A61C 17/222* (2013.01); *A46B 5/0095* (2013.01); *A46B 15/0044* (2013.01); *A61C 17/221* (2013.01)

(58) Field of Classification Search
CPC ............................ A61C 17/222; A46B 5/0095
See application file for complete search history.

(56) References Cited

U.S. PATENT DOCUMENTS

| 4,827,550 A | 5/1989 | Graham et al. |
| 5,289,604 A | 3/1994 | Kressner |

(Continued)

FOREIGN PATENT DOCUMENTS

| CN | 101991274 | 3/2011 |
| CN | 101557775 | 6/2013 |

(Continued)

OTHER PUBLICATIONS

International Search Report and the Written Opinion of the International Searching Authority issued in International Application PCT/CN2020/087935 mailed Jan. 27, 2021.

(Continued)

*Primary Examiner* — Shay Karls

(57) ABSTRACT

An oral care refill head (300), the oral care refill head (300) may be detachably coupled to a handle (200). The handle (200) may include a stem (250) that is received within a connection cavity (326) of the oral care refill head (300). The stem (250) and the connection cavity (326) may have specific geometries and structures to ensure an adequate coupling therebetween. An oral care implement (100), the oral care implement (100) have a pressure sensing assembly, excessive pressure applied onto the oral care refill head (300) will cause the motor (140) and a motor chassis (401) to rock. As the motor chassis (401) rocks, a contact element (456) thereon will actuate a pressure actuator element (455). In response, a control unit (150) may initiate generation of a user perceptible signal to inform the user of the excess pressure.

16 Claims, 19 Drawing Sheets

(56)     References Cited

U.S. PATENT DOCUMENTS

| | | |
|---|---|---|
| 7,120,960 B2 | 10/2006 | Hilscher et al. |
| 7,690,067 B2 | 4/2010 | Schaefer et al. |
| 8,479,750 B2 | 7/2013 | Schaefer et al. |
| 9,724,180 B1 | 8/2017 | Liu |
| D819,337 S | 6/2018 | Yuan et al. |
| D819,973 S | 6/2018 | Greve et al. |
| D874,830 S | 2/2020 | Choi et al. |
| 10,610,008 B2 | 4/2020 | Wagner et al. |
| 10,704,660 B2 | 7/2020 | Fritsch et al. |

FOREIGN PATENT DOCUMENTS

| | | |
|---|---|---|
| CN | 103889365 | 6/2014 |
| CN | 103932497 | 7/2014 |
| CN | 104619212 | 5/2015 |
| CN | 107693151 | 2/2018 |
| CN | 108056833 | 5/2018 |
| CN | 207323577 | 5/2018 |
| CN | 108354687 | 8/2018 |
| CN | 108403239 | 8/2018 |
| CN | 109124801 | 1/2019 |
| CN | 210056312 | 2/2020 |
| CN | 111053622 | 4/2020 |
| CN | 210472325 | 5/2020 |
| CN | 111643209 | 9/2020 |
| DE | 202004006435 | 8/2004 |
| EP | 2234561 | 10/2010 |
| EP | 2104466 | 11/2013 |
| EP | 3470015 | 4/2019 |
| WO | 1999/020202 | 4/1999 |
| WO | 2005/046506 | 5/2005 |
| WO | 2009/077922 | 6/2009 |
| WO | 2013/101300 | 7/2013 |
| WO | 2019/157787 | 8/2019 |
| WO | 2021/217535 | 11/2021 |
| WO | 2022/120671 | 6/2022 |

OTHER PUBLICATIONS

International Search Report and the Written Opinion of the International Searching Authority issued in International Application PCT/CN2020/135086 mailed Sep. 9, 2021.

ORAL CARE IMPLEMENT AND REFILL HEAD THEREOF

CROSS-REFERENCE TO RELATED PATENT APPLICATION

This application is a national stage entry under 35 U.S.C. § 371 of International Patent Application No. PCT/CN2020/087935, filed Apr. 30, 2020, the contents of which are hereby incorporated herein by reference in its entirety.

BACKGROUND

Toothbrushes generally include a handle for gripping by a user and a head that has cleaning elements thereon that engage the user's oral cavity surfaces for cleaning. In manual toothbrushes, the cleaning elements become worn after several months of use which requires replacement of the entire toothbrush. In electric toothbrushes, the cleaning elements become worn after several months of use which requires replacement of a refill head that is configured to be coupled to a particular handle. Toothbrush manufacturers generally design such electric toothbrushes with very specific connection mechanisms to ensure that only refill heads that they manufacture can be used with the handle that they manufacture. Moreover, ensuring a tight fit between the handle and the oral care refill head while allowing vibrations generated by a motor to be imparted to the cleaning elements and minimized at the handle are important considerations in the design of such connection mechanisms. Thus, there remains a need to design new connection mechanisms for this purpose. Furthermore, when brushing it is important to make sure that the user does not apply too much pressure onto the teeth and gums because doing so will not only cause the cleaning elements to become worn more quickly, but it can also cause damage to the user's teeth and gums. Thus, a need also exists for an oral care implement having a pressure detection and indication system to readily inform the user when they are applying too much pressure onto the teeth and gums.

BRIEF SUMMARY

The present invention may be directed to an oral care implement having an oral care refill head and a handle. The oral care refill head may be detachably coupled to the handle. Specifically, the handle may include a stem that is received within a connection cavity of the oral care refill head. The stem and the connection cavity may have specific geometries and structures to ensure an adequate coupling therebetween. The present invention may also be directed to an oral care implement having a pressure sensing assembly. Specifically, excessive pressure applied onto the oral care refill head will cause the motor and a motor chassis to rock. As the motor chassis rocks, a contact element thereon will actuate a pressure actuator element. In response, a control unit may initiate generation of a user perceptible signal to inform the user of the excess pressure.

In one aspect, the invention may be an oral care refill head for detachable coupling to a handle, the oral care refill head comprising: a head portion comprising an oral care treatment tool; an attachment portion extending along a longitudinal axis from a proximal end to a distal end, the head portion located at the distal end of the attachment portion, the attachment portion comprising: a connection cavity defined by an inner sidewall and an inner end wall of the attachment portion, the connection cavity extending along a cavity axis from an opening in the proximal end of the attachment portion to the inner end wall of the attachment portion, the connection cavity configured to receive a stem of the handle; a locking protuberance protruding from the inner sidewall into the connection cavity and configured to engage a locking depression of the stem, the locking protuberance located at a first axial distance from the proximal end of the attachment portion; a first radial shoulder formed in the inner sidewall and located a second axial distance from the proximal end of the attachment portion, the first radial shoulder circumferentially aligned with the locking protuberance and the second axial distance being greater than the first axial distance; and a second radial shoulder formed in the inner sidewall and located on an opposite side of the inner sidewall than the first radial shoulder, the second radial located a third axial distance from the proximal end of the attachment portion that is greater than the second axial distance.

In another aspect, the invention may be oral care implement comprising: a handle comprising: a gripping portion having a housing defining an internal chamber and a distal end surface; a rocker unit mounted within the internal chamber so as to be rockable relative to the housing about a fulcrum, the rocker unit comprising: a stem extending from the distal end surface of the gripping portion and configured to be detachably coupled to the oral care refill head; a motor operably coupled to the stem to impart movement to the stem; and a motor chassis supporting the motor and comprising a contact element; and a power source positioned within the internal chamber; a control unit operably coupled to the motor and the power source, the control unit comprising an actuator element, the control unit configured to initiate generation of a user perceptible signal upon the actuator element being actuated; and wherein upon a pressure being applied to the oral care treatment tool that exceeds a pressure threshold, the rocking unit is altered from a normal position to an excessive-pressure position in which the contact element actuates the actuator element.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
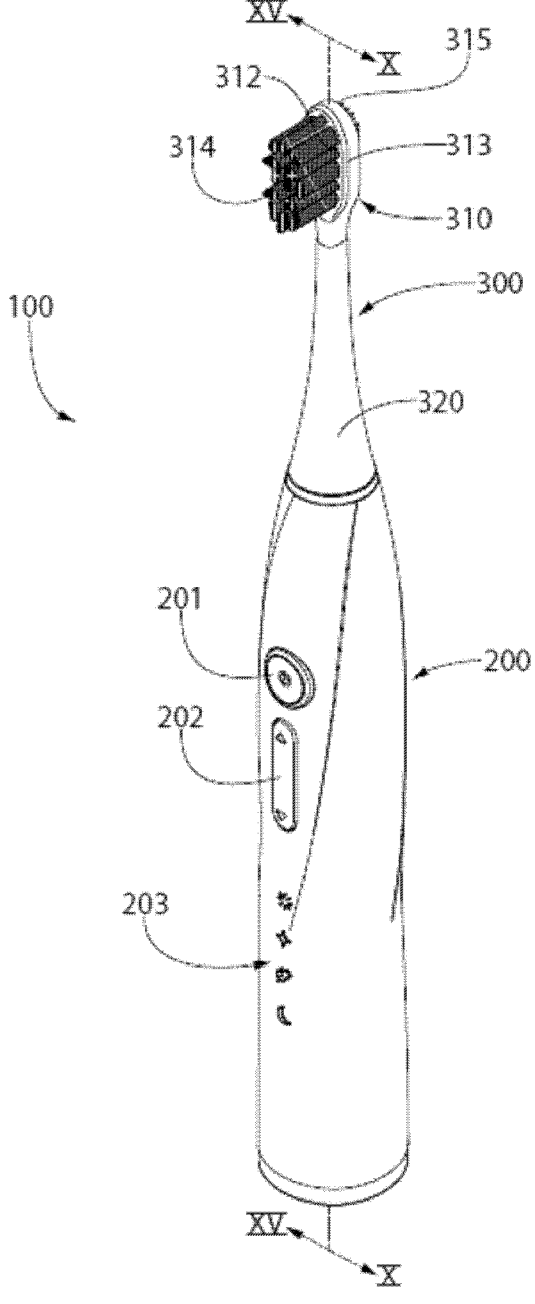
FIG. 1 is a front perspective view of an oral care implement in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Figure 2:
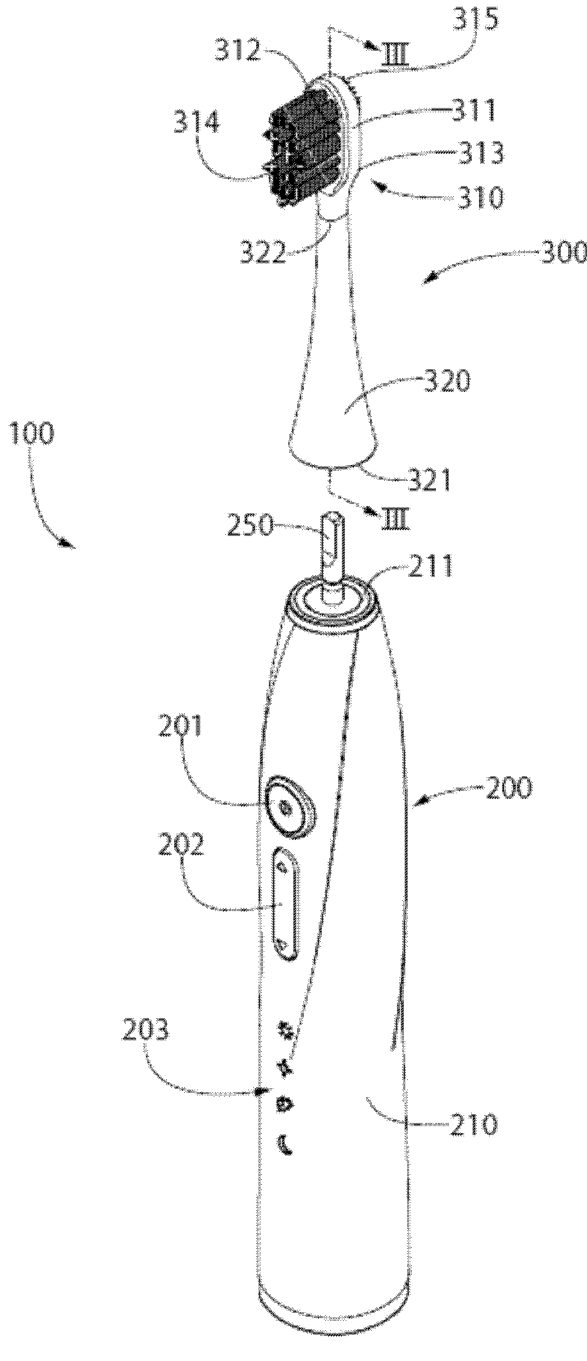
FIG. 2 is a front perspective view of the oral care implement of FIG. 1 with an oral care refill head detached from a handle.

Referring first to FIGS. 1 and 2, an oral care implement 100 will be described in accordance with an embodiment of the present invention. In the exemplified embodiment, the oral care implement 100 is a powered or electric toothbrush. In other embodiments, the oral care implement 100 may be a manual toothbrush. In still other embodiments, the oral care implement 100 may be other hygienic tools for treating the oral cavity such as a tongue scraper, a gum and soft tissue cleanser, a water pick, an interdental device, a tooth polisher, a specially designed ansate implement having tooth engaging elements, or any other type of implement that is commonly used for oral care. In still other embodiments, the oral care implement 100 may be a personal care implement instead of an oral care implement. Examples of such personal care implements include hairbrushes, razors, body scrubbers, skin treatment devices, or the like. The oral care implement 100 generally comprises a handle 200 and an oral care refill head 300. Thus, it is to be understood that the inventive concepts discussed herein can be applied to any type of oral care implement or personal care implement unless a specific type of implement is specified in the claims. The structural and functional details of the oral care implement 100 will be provided below in accordance with exemplary embodiments of the present invention.

The handle 200 is the portion of the oral care implement 100 that is gripped by a user during use. The oral care refill head 300 is the portion of the oral care implement 100 that performs the cleaning or other hygienic function. As shown in FIG. 2, the oral care refill head 300 can be detached from the handle 200, and thus when they are coupled the oral care refill head 300 is detachably coupled to the handle 200. Thus, the oral care refill head 300 may be detached from the handle 200 and replaced with a new oral care refill head 300 when cleaning elements on the oral care refill head 300 become worn over time. This allows the handle 200 to continue to be used while the oral care refill head 300 is exchanged, which is important because the expensive electronic circuitry is located within the handle 200. Multiple users can also use the same handle 200 while placing their individual oral care refill heads thereon prior to use.

The handle 200 comprises a gripping portion 210 that terminates at a distal end surface 211 and a stem 250 protruding from the distal end surface 211 of the gripping portion 210. The gripping portion 210 is the part of the handle 200 that is gripped by a user during oral hygiene activities and it may include various buttons, switches, indicators, lights, user controls, or the like to both allow a user to control functionality and operation of the oral care implement 100 and also provide information to the user. For example, the handle 200 may comprise a power button 201 that can power the oral care implement 100 on and off (and provide power to a motor thereof as described in more detail below). The handle 200 may also include an intensity button 202 that allows the user to modify the speed or intensity of the motor or allows the user to change a mode of operation of the motor. The handle 200 may also include various indicators 203 that may be activated (e.g., lights that may be illuminated) to inform a user when the battery is low, when the user is brushing with too much pressure, when the oral care implement 100 is powered on, and various other information that may be helpful to a user.

Figure 10:
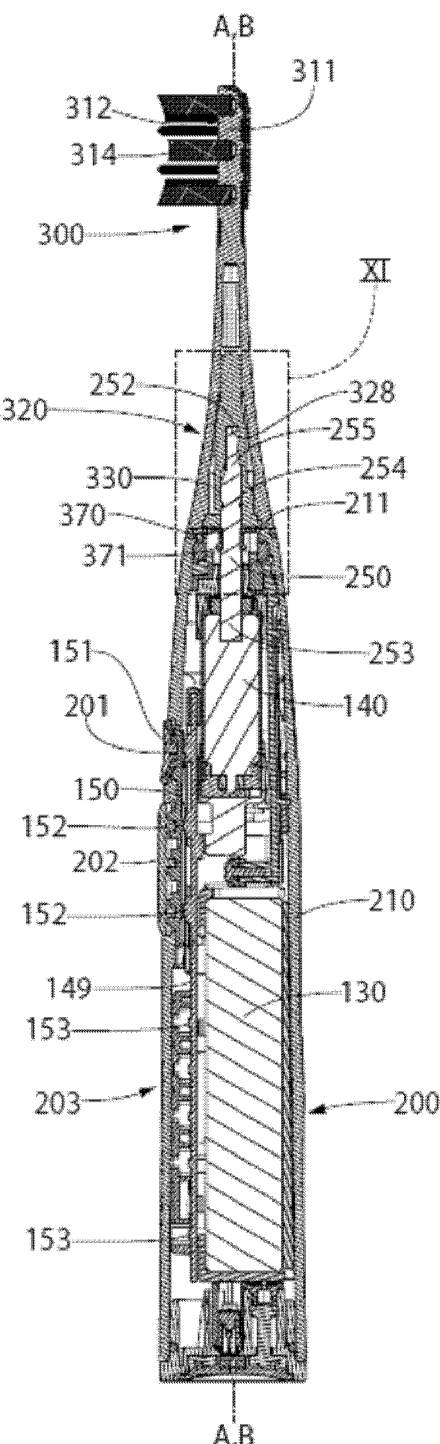
FIG. 10 is a cross-sectional view taken along line X-X of FIG. 1.

Referring to FIGS. 2 and 10, as noted above the handle 200 houses the electronic components associated with the oral care implement 100. Thus, as shown in FIG. 10, the gripping portion 210 of the handle 200 houses a motor 130 and a power source 140 that are operably coupled together. Thus, when a user presses the power button 201, power is supplied form the power source 140 to the motor 130 and the motor 130 is activated. The stem 250 is operably coupled to the motor 130 and may form a portion of a drive shaft of the motor 130 or the stem 250 may be operably coupled to a drive shaft of the motor 130. For example, the stem 250 may form a distal portion of the drive shaft of the motor 130. In some embodiments, the stem 250 may be a plastic housing or the like that surrounds the drive shaft of the motor 130 with the plastic housing that surrounds the drive shaft forming the coupling between the handle 200 and the oral care refill head 300. In the exemplified embodiment, the stem 250 is operably coupled to the motor 130 and due to that coupling, upon activating the motor 130 by powering on the oral care implement 100, the motor 130 will impart movement to the stem 250 thereby causing the stem 250 to rotate, oscillate, or the like. Furthermore, when the oral care refill head 300 is coupled to the handle 200 as shown in FIG. 10, such movement of the stem 250 will create vibrations on the oral care refill head 300, or at least the cleaning elements thereof, to optimize the cleaning performance. The stem 250 forms the feature of the handle 200 that couples to the oral care refill head 300 and also imparts movement to the cleaning elements of the oral care refill head 300.

As also seen in FIG. 10, there is a control unit 150 in the handle 200. In the exemplified embodiment, the control unit 150 comprises a printed circuit board 149 and several electronic components thereon in electrical communication with one another. For example, the control unit 150 may comprise a power actuator 151. The power button 201 may be in operable coupling with the power actuator 151 of the control unit 150 to control the power on and power off function of the motor 140. Thus, pressing the power button 201 will cause the power button 201 to engage and actuate the power actuator 151, which will cause the control unit 150 to power the motor 140 on and/or off. The intensity button 202 may be in operable coupling with an intensity actuator 152 of the control unit 150 so that pressing the up or down arrows of the intensity button 202 causes the intensity button 202 to engage and actuate the intensity actuator 152, and in response the control unit 150 will change the mode of operation or increase or decrease the motor intensity or speed.

The indicators 203 may be formed by transparent portions of the handle 200 that are aligned with light sources 153 on the control unit 150 that illuminate when different thresholds are met. For example, when the battery power is below a threshold, a low battery light may illuminate and be seen through a transparent portion of the handle 200 (such as an icon that is readily identifiable as a battery power indicator). Furthermore, when excessive pressure is felt during brushing, a high pressure light may illuminate. Of course, other indicators 203 may be used to provide different indications to a user as desired. The control unit 150 may comprise a controller or processor that receives input from the various actuators and transmits instructions to the power source 130, motor 140, and various light sources to activate and deactivate accordingly. However, a processor or controller is not needed in all embodiments and in other embodiments activating and deactivating the various actuators opens and closes a switch which either causes power to be supplied to or prevents power from being supplied to the various components for activation and deactivation thereof. The various actuators described herein as being part of the control unit 150 may be various switches including trigger switches, contact switches, conductive switches, throw switches, push button switches, pressure switches, toggle switches, or other mechanical type switches. In other embodiments electronic switches could be used in place of the mechanical type switches.

Turning again to FIGS. 1 and 2, the oral care refill head 300 comprises a head portion 310 and an attachment portion 320. The head portion 310 comprises an oral treatment tool (or head structure) 311 having a front surface 312 and a rear surface 313. Furthermore, the head portion 310 comprises a plurality of tooth cleaning elements 314 extending from the front surface 312 of the oral treatment tool 311. The plurality of tooth cleaning elements 314 may comprise bristle tufts, filament bristles, fiber bristles, nylon bristles, polybutylene terephthalate (PBT) bristles, spiral bristles, rubber bristles, elastomeric protrusions, flexible polymer protrusions, lamella, combinations thereof, and/or structures containing such materials or combinations. Thus, any combination of these elements may be used to form one or more of the tooth cleaning elements 314 in some embodiments. Furthermore, where bristles are used for one or more of the tooth cleaning elements 314, such bristles can be tapered, end-rounded, spiral, or the like. The tooth cleaning elements 314 may be coupled to the head portion 310 using any known techniques such as staples, anchor-free tufting, in-mold tufting, PTT, or the like. In the exemplified embodiment, the tooth cleaning elements 314 comprises a plurality of tufts of bristles arranged in a particular pattern on the head portion 310. Of course, the particular pattern of the tooth cleaning elements 314 is not to be limiting of the present invention unless specifically claimed as such.

Furthermore, in the exemplified embodiment there is a soft tissue cleaner 315 positioned on the rear surface 313 of the head portion 310 of the oral care refill head 300. The soft tissue cleaner 315 may be an elastomeric material such as thermoplastic elastomer that is injection molded onto the rear surface 313 of the head portion 310. The soft tissue cleaner 315 may include a pad portion 316 and a plurality of protuberances 317 protruding from the pad portion 316 (see FIG. 3 for best illustration of pad portion 316 and protuberances 317). Alternatively, the soft tissue cleaner 315 may include ridges, depressions, nubs, or any desirable feature for cleaning and/or scraping the tongue and its papillae.

Figure 3:
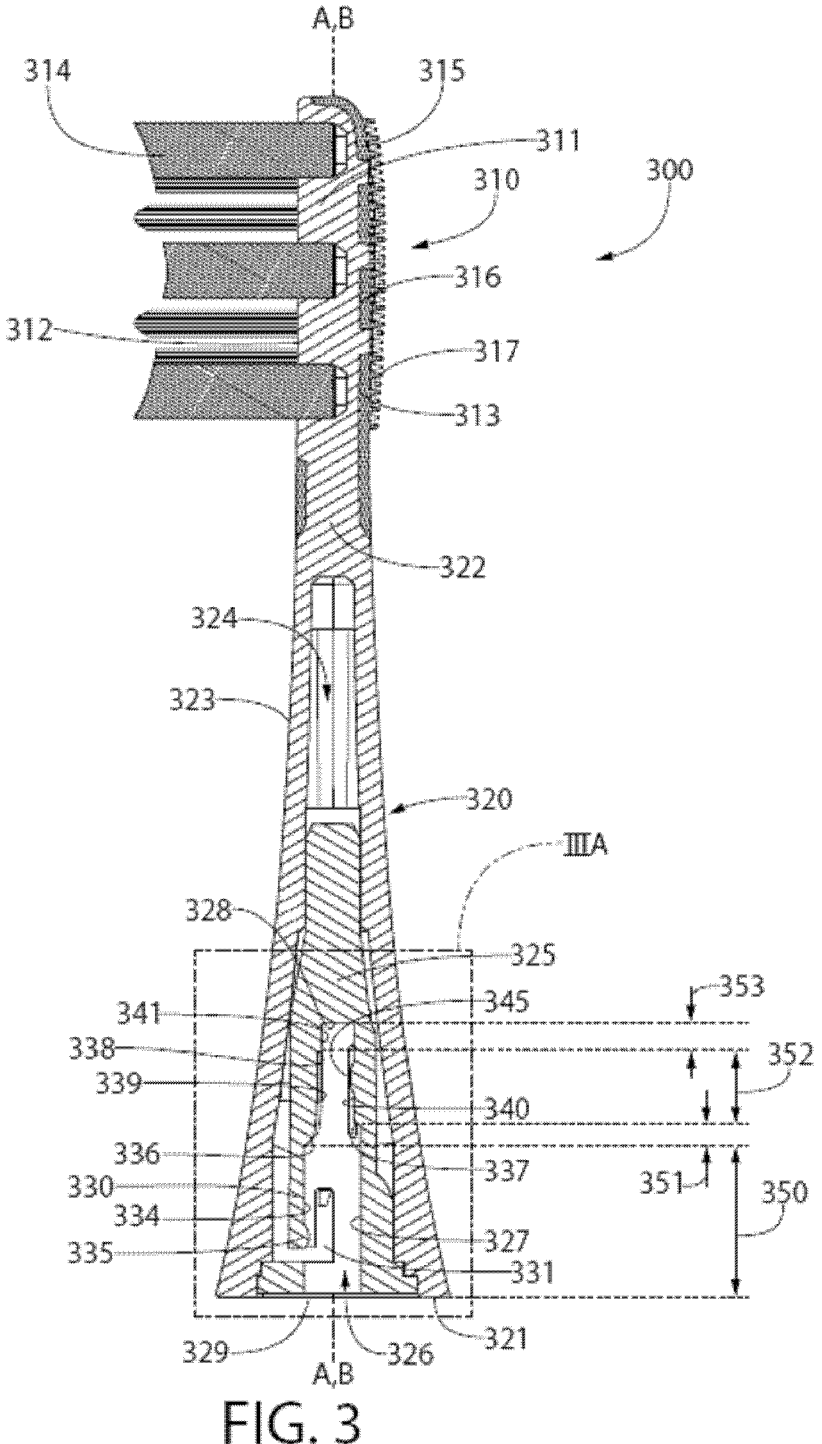
FIG. 3 is a cross-sectional view taken along line III of FIG. 2.
Figure 3A:
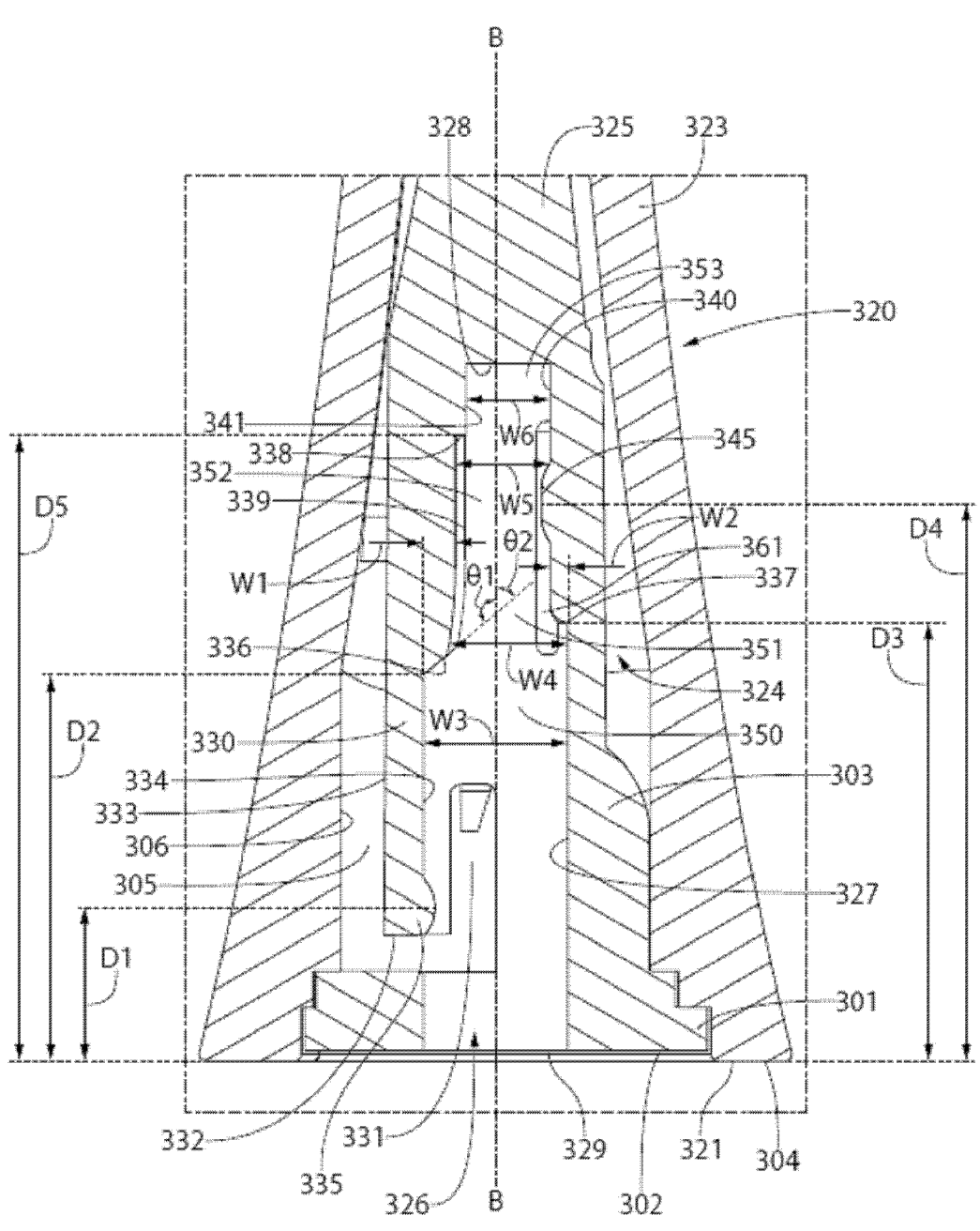
FIG. 3A is a close-up view of area IIIA of FIG. 3.
Figure 4:
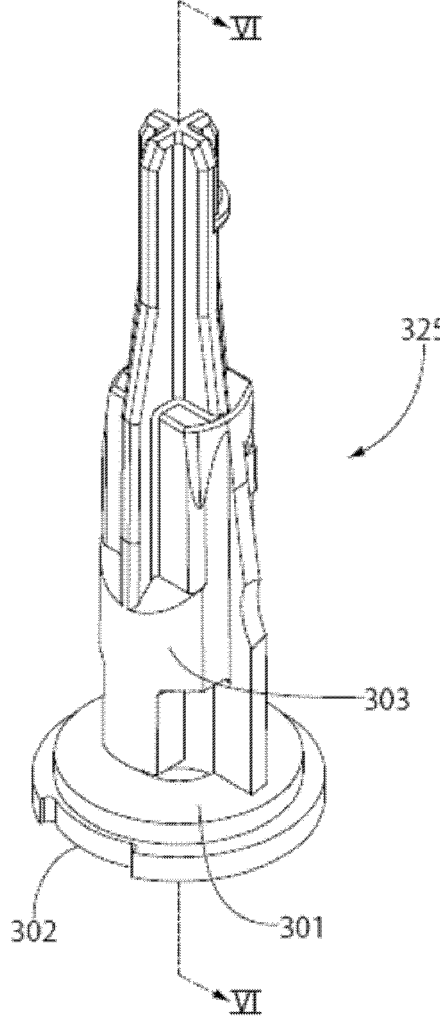
FIG. 4 is a perspective view of an insert coupler of the oral care refill head of the oral care implement of FIG. 1.
Figure 5:
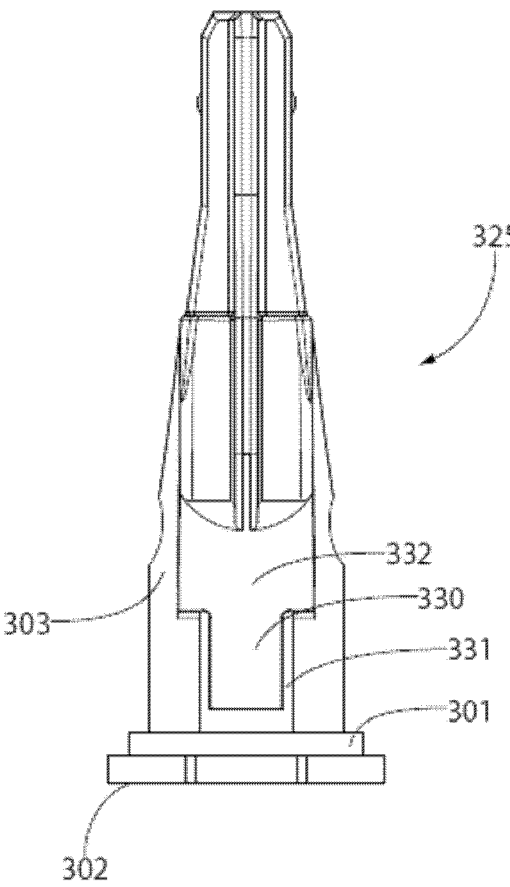
FIG. 5 is a front view of the insert coupler of FIG. 4.
Figure 6:
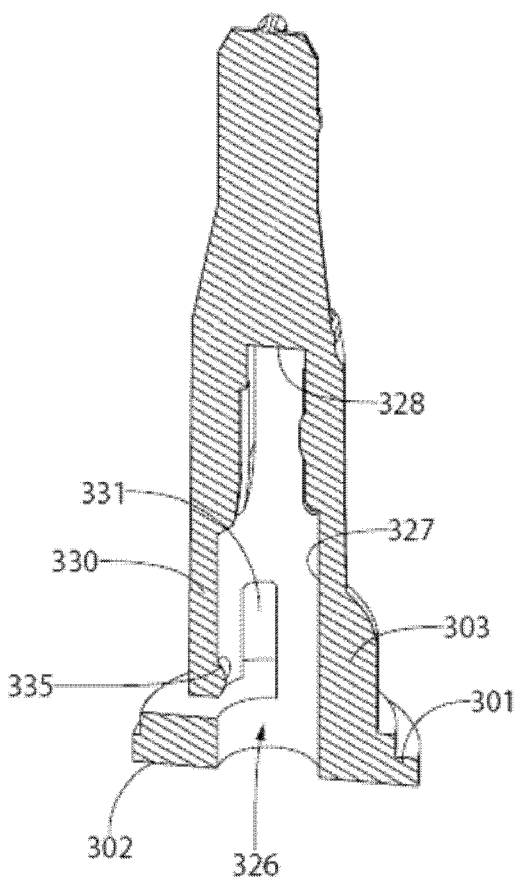
FIG. 6 is a cross-sectional view taken along line VI-VI of FIG. 4.

Referring to FIGS. 3 and 3A, the oral care refill head 300, and specifically the attachment portion 320 thereof, will be described in greater detail. The attachment portion 320 of the oral care refill head 300 is fixed to the head portion 310 and extends directly from the head portion 310. The attachment portion 320 comprises a proximal end 321 and a distal end 322, and the head portion 310 is located at the distal end 322. The attachment portion 320 of the oral care refill head 300 extends along a longitudinal axis A-A from the proximal end 321 to the distal end 322. Furthermore, in the exemplified embodiment the attachment portion 320 comprises an outer sleeve portion 323 that comprises a central cavity 324 and an insert coupler 325 that is fixed within the central cavity 324 of the outer sleeve portion 323. In the exemplified embodiment, the outer sleeve portion 323 is integrally formed with the head portion 210 and the insert coupler 325 is a separate component that is positioned within the central cavity 324 of the outer sleeve portion 323 and fixed thereto. In some alternative embodiments, the insert coupler 325 could be omitted and the features of the insert coupler 325 described herein could be formed integrally with the outer sleeve portion 323. The features of the insert coupler 325 may be described more generally as being features of the attachment portion 320 of the oral care refill head 300, and any such features could be formed from the outer sleeve portion 323, the insert coupler 325, or a combination of both.

The insert coupler 325 comprises and/or defines a connection cavity 326. Specifically, the insert coupler 325 comprises an inner sidewall 327 and an inner end wall 328 that collectively define the connection cavity 326. The connection cavity 326 is a blind hole formed into the insert coupler 325 that ends at the inner end wall 328. The connection cavity 326 is designed and configured to receive the stem 250 of the handle 200 when the oral care refill head 300 is coupled to the handle 200. The connection cavity 326 extends along a cavity axis B-B that is coaxial with the longitudinal axis A-A of the attachment portion 320 of the oral care refill head 300. The connection cavity 326 extends along the cavity axis B-B from an opening 329 in the proximal end 321 of the attachment portion 320 to the inner end wall 328.

Referring to FIGS. 3-6, the insert coupler 325 comprises an annular ring structure 301 that forms an annular proximal end surface 302 of the insert coupler 325 and a body structure 303 extending from an upper surface of the annular ring structure 301 that is opposite the annular proximal end surface 302 of the annular ring structure 301. The body structure 303 comprises a radially deflectable arm 330 that forms a part of the inner sidewall 327. Specifically, a through-slot 331 is formed into the body structure 303 to define the radially deflectable arm 330. The through-slot 331 is a U-shaped opening formed into and through the body structure 303 of the insert coupler 325 to define the radially deflectable arm 330. The through-slot 331 separates a distal end 332 of the radially deflectable arm 330 from the annular ring structure 301 and then extends upwardly along both opposing side edges of the radially deflectable arm 330. As a result, the radially deflectable arm 330 is able to deflect radially relative to the remainder of the body structure 303 and relative to the annular ring structure 301. Thus, the radially deflectable arm 330 is capable of deflecting inward into and towards the cavity axis B-B and outward away from the cavity axis B-B. Specifically, the radially deflectable arm 330 can flex inwardly and outwardly about a living hinge 332 that is located at the same elevation as the distal ends of the U-shaped through-slot 331. The radially deflectable arm 330 may flex/pivot about the living hinge 332 in the manner described during insertion of the stem 250 of the handle 200 into the connection cavity 326 and removal of the stem 250 of the handle 200 from the connection cavity 326.

As best shown in FIG. 3A and mentioned above, the insert coupler 325 is positioned within the central cavity 324 of the outer sleeve portion 323. The insert coupler 325 may be fixed to the outer sleeve portion 323 using mechanical interference, tight fit, interference fit, nub and recess, adhesives, ultrasonic welding, or the like in various different embodiments. However, it should be appreciated that the insert coupler 325 is fixed to and therefore non-movable relative to the outer sleeve portion 323 of the attachment portion 320 of the oral care refill head 300. The outer sleeve portion 323 comprises an annular proximal end surface 304 that is substantially coplanar with and circumscribes the annular proximal end surface 302 of the insert coupler 325. In the embodiment shown, the annular proximal end surface 302 of the insert coupler 325 is slightly recessed relative to the annular proximal end surface 304 of the outer sleeve portion 323, but they may be exactly coplanar in other embodiments. However, the slight recess of 1-2 mm is still considered to be substantially coplanar as that phrase is used herein. In the exemplified embodiment, no portion of the insert coupler 325 protrudes beyond the annular proximal end surface 304 of the outer sleeve portion 323. Rather the annular proximal end surface 302 of the insert coupler 325 is either flush with or slightly recessed relative to the annular proximal end surface 304 of the outer sleeve portion 323. The insert coupler 325 does not cover or overlie any part of the annular proximal end surface 304 of the outer sleeve portion 323. Rather, the annular proximal end surface 304 of the outer sleeve portion 323 remains entirely exposed along the proximal end 321 of the attachment portion 320. The annular proximal end surface 304 of the outer sleeve portion

323 and the annular proximal end surface 302 of the insert coupler 325 collectively form the proximal end 320 of the attachment portion 320.

Furthermore, still referring to FIG. 3A, when the insert coupler 325 is located within the central cavity 324 of the outer sleeve portion 323, a gap 305 exists between an inner surface 306 of the outer sleeve portion 323 and an outer surface 333 of the radially deflectable arm 330. This gap 305 is needed to allow the radially deflectable arm 330 to deflect outwardly away from the cavity axis B-B during insertion/ removal of the stem 250 of the handle 200 from the connection cavity 326 as briefly mentioned above.

Referring again to FIGS. 3 and 3A, the radially deflectable arm 330 comprises an inner surface 334 that is opposite to the outer surface 333. The inner surface 334 of the radially deflectable arm 330 forms a portion of the inner sidewall 327 of the connection cavity 326. Furthermore, the radially deflectable arm 330 comprises a locking protuberance 335 protruding from the inner surface 334 of the radially deflectable arm 330 and into the connection cavity 326. In the exemplified embodiment, the locking protuberance 335 is a dome-shaped or convex structure that protrudes from the inner surface 334 of the radially deflectable arm 330 at (or immediately adjacent to) the distal end 332 of the radially deflectable arm 330. However, the locking protuberance 335 could take on other shapes in other embodiments such as being a linear structure or the like. In still other embodiments, the locking protuberance 335 could be a locking groove instead, this structure being dependent on the structure of a locking groove or protuberance of the stem 250 of the handle 200 with which it is intended to engage. Furthermore, the exact location of the locking protuberance 335 along the radially deflectable arm 330 may be modified slightly so that the locking protuberance 335 is spaced a short distance from the distal end 332 of the radially deflectable arm 330 in some embodiments. The locking protuberance 335 is configured to engage a locking depression formed into the stem 250 as described in greater detail below with reference to FIGS. 10 and 11. The locking protuberance 335 is located at a first axial distance D1 from the proximal end 321 of the attachment portion 320. Although the first axial distance D1 is marked in FIG. 3A as being located at an axial centerpoint along the locking protuberance 335, the invention is not limited to this and the first axial distance D1 could be located at any axial location along the locking protuberance 335.

The inner sidewall 326 of the attachment portion 320 (which is formed by the inner surface of the insert coupler 325 in the exemplified embodiment) comprises a first radial shoulder 336 located a second axial distance D2 from the proximal end 321 of the attachment portion 320. The second axial distance D2 is greater than the first axial distance D1 such that the first radial shoulder 336 is located further from the proximal end 321 of the attachment portion 320 than the locking protuberance 335. The first radial shoulder 336 is circumferentially aligned with the locking protuberance 335. Thus, the first radial shoulder 336 and the locking protuberance 335 are located on the same side of the cavity axis B-B. Although the second axial distance D2 is marked in FIG. 3A as being located at a proximal-most end of the first radial shoulder 336, the invention is not to be so limited in all embodiments and the second axial distance D2 could be positioned at any axial location along the first radial shoulder 336.

It should be understood that the phrase "circumferentially aligned" means that the features, elements, or components mentioned are at the same angular position. This is similar to axially aligned, except that it includes the features, elements, or components being positioned at different radial distances from the relevant axis. Thus, the first radial shoulder 336 and the locking protuberance 335 are at the same angular position relative to the cavity axis B-B. Other features are mentioned below as being circumferentially aligned and they should also be understood to be located at the same angular position. Furthermore, the term "radial" means that the shoulder(s) described herein extend in a radial direction relative to the cavity axis B-B. In the exemplified embodiment, the shoulders described herein (including the first radial shoulder 336 and other radial shoulders described below) do not extend along the entire circumference of the inner sidewall 327, although they may in alternative embodiments.

The first radial shoulder 336 is oriented at a first oblique angle Θ1 relative to the cavity axis B-B. Furthermore, the first radial shoulder 336 is planar in the exemplified embodiment. The first radial shoulder 336 also has a first radial width W1 measured from the inner surface 335 of the radially deflectable arm 330 to an end of the first radial shoulder 336 located furthest from the proximal end 321 of the attachment portion 320. The inner surface 334 of the radially deflectable arm 330 is planar from the locking protuberance 335 to the first radial shoulder 336.

The inner sidewall 327 of the attachment portion 320 (which is formed by the inner surface of the insert coupler 325 in the exemplified embodiment) comprises a second radial shoulder 337 located a third axial distance D3 from the proximal end 321 of the attachment portion 320. The third axial distance D3 is greater than the second axial distance D2 such that the second radial shoulder 337 is located further from the proximal end 321 of the attachment portion 320 than the first radial shoulder 336 and the locking protuberance 335. Although the third axial distance D3 is marked in FIG. 3A as being located at a proximal-most end of the second radial shoulder 337, the invention is not to be so limited in all embodiments and the third axial distance D3 could be positioned at any axial location along the first radial shoulder 337.

In the exemplified embodiment, the second radial shoulder 337 is not transversely aligned with the first radial shoulder 336. That is, there is no transverse axis (transverse to the cavity axis B-B) that intersects both of the first and second radial shoulders 336, 337. This is because the starting point of the second radial shoulder 337 (the end of the second radial shoulder 337 that is closest to the proximal end 321 of the attachment portion 320) is located further from the proximal end 321 of the attachment portion 320 than the ending point of the first radial shoulder 336 (the end of the first radial shoulder 336 that is closest to the proximal end 321 of the attachment portion 320).

The second radial shoulder 337 is located on the opposite side of the inner sidewall 327 than the first radial shoulder 336 and the locking protuberance 330. Thus, while the first radial shoulder 336 and the locking protuberance 330 are located on a first side of the cavity axis B-B, the second radial shoulder 337 is located on a second side of the cavity axis B-B. The second radial shoulder 337 has a radial width W2 that is less than the radial width W1 of the first radial shoulder 336. Thus, the second radial shoulder 337 is shallower or shorter than the first radial shoulder 336. The second radial shoulder 337 may be oriented at a second oblique angle Θ2 relative to the cavity axis B-B, the second oblique angle Θ2 being different than the first oblique angle Θ1. However, in the exemplified embodiment the second radial shoulder 337 is arcuate or curved rather than being planar. The second radial shoulder 337 may be planar in other embodiments.

The inner sidewall 327 of the attachment portion 320 also comprises a third radial shoulder 338 located a fifth axial distance D5 from the proximal end 321 of the attachment portion 320. The fifth axial distance D5 is grater than the first, second, and third axial distances D1, D2, D3 and thus the third radial shoulder 338 is located further from the proximal end 321 of the attachment portion 320 than each of the locking protuberance 330, the first radial shoulder 336, and the second radial shoulder 337. In the exemplified embodiment, the third radial shoulder 338 is oriented perpendicular to the cavity axis B-B, although the invention is not to be so limited in all embodiments. The third radial shoulder 338 is circumferentially aligned with the first radial shoulder 336 and with the locking protuberance 330. Thus, the locking protuberance 330, the first radial shoulder 336, and the third radial shoulder 338 are located on the same side of the cavity axis B-B and the second radial shoulder 337 is located on the other side of the cavity axis B-B.

The inner sidewall 327 comprises several planar sections that are delineated and/or bounded by the various radial shoulders 336, 337, 338 mentioned herein. Thus, the inner sidewall 327 of the attachment portion 320 comprises a first planar section 339 located between the first radial shoulder 336 and the third radial shoulder 338, a second planar section 340 located between the second radial shoulder 337 and the inner end wall 328 of the connection cavity 326, and a third planar section 341 located between the third radial shoulder 338 and the inner end wall 328 of the connection cavity 326. The first and third planar sections 339, 341 are circumferentially aligned with the first and third radial shoulders 336, 338. The second planar section 340 is circumferentially aligned with the second radial shoulder 337. Thus, the first and third planar sections 339, 341 are located on one side of the cavity axis B-B and the second planar section 340 is located on an opposite side of the cavity axis B-B. While the first and third planar sections 339, 341 are circumferentially aligned, they are radially offset such that the third planar section 341 is located closer to the cavity axis B-B than the first planar section 339. The third planar section 341 and possibly also the second planar section 340 are configured to contact a distal stem section of the stem 250 of the handle 200 as described further below.

In the exemplified embodiment, the first planar section 339 has a slight curvature as it extends near to the first radial shoulder 336. However, the invention is not to be so limited in all embodiments and the first planar section 339 may be completely planar in other embodiments. Furthermore, an upper portion of the first planar section 339 is completely planar in the exemplified embodiment.

The inner sidewall 327 also has planar sections extending from the first radial shoulder 336 to the locking protuberance 335 and from the second radial shoulder 337 to the proximal end 321 of the attachment portion 320. The planar section extending from the first radial shoulder 336 to the locking protuberance 335 is circumferentially aligned with the first and third planar sections 339, 341 but radially offset such that the first planar section 339 is located closer to the cavity axis B-B than the planar section extending from the first radial shoulder 336 to the locking protuberance. The planar section extending from the second radial shoulder 337 to the proximal end 321 is circumferentially aligned with the second planar section 340 but radially offset such that the second planar section 340 is located closer to the cavity axis B-B than the planar section extending from the second radial shoulder 337 to the proximal end 321 of the attachment portion 320.

The attachment portion 320 of the oral care refill head 300 comprises an engagement protuberance 345 protruding from the inner sidewall 327 and into the connection cavity 326. In the exemplified embodiment, the engagement protuberance 345 is located along and extends or protrudes from the second planar section 340 of the inner sidewall 327 between the second radial shoulder 337 and the inner end wall 328. The engagement protuberance 345 is located a fourth axial distance D4 from the proximal end 321 of the attachment portion 320. The fourth axial distance D4 is greater than each of the first, second, and third axial distances D1, D2, D3 but less than the fifth axial distance D5. Thus, the engagement protuberance 345 is located further from the proximal end 321 of the attachment portion 320 than the locking protuberance 335, the first radial shoulder 336, and the second radial shoulder 337, but the third radial shoulder 338 is located further from the proximal end 321 of the attachment portion 320 than the engagement protuberance 345. As will be described in greater detail below with reference to FIG. 11, the engagement protuberance 345 is configured to engage the stem 250 of the handle 200 via a compression fit to hold the stem 250 in place and maintain the connection between the oral care refill head 300 and the handle 200.

The connection cavity 326 has several axial sections that are delineated by the various radial shoulders described herein. Specifically, the connection cavity 326 comprises a first axial cavity section 350 extending from the proximal end 321 of the attachment portion 320 to the first radial shoulder 336. The first axial cavity section 350 has a first width W3. The connection cavity 326 comprises a second axial section 351 extending from the first radial shoulder 336 to the second radial shoulder 337. The second axial section 351 has a second width W4 that is less than the first width W3. The connection cavity 326 comprises a third axial section 352 extending from the second radial shoulder 337 to the third radial shoulder 338. The third axial cavity 352 has a third width W5 that is less than the second width W4. The connection cavity 326 comprises a fourth axial section 353 extending from the third axial shoulder 338 to the inner end wall 328. The fourth axial section 353 has a fourth width W6 that is less than the third width W5. In the exemplified embodiment, the first axial cavity section 350 has a circular transverse cross-sectional profile.

Figure 7:
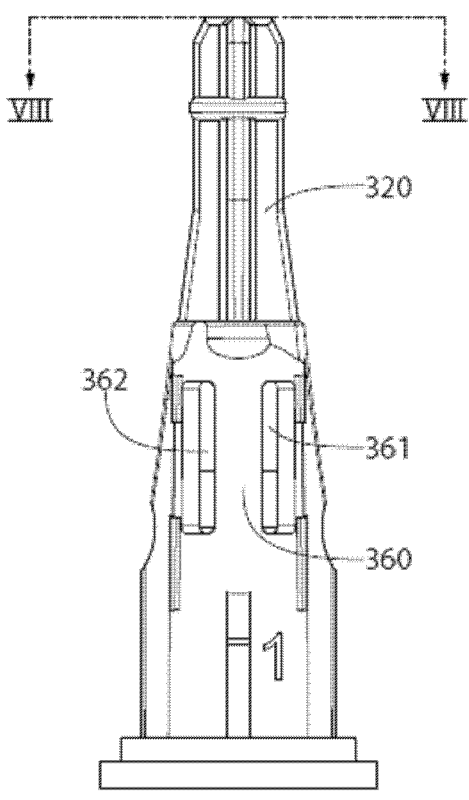
FIG. 7 is a rear view of the insert coupler of FIG. 4.
Figure 8:
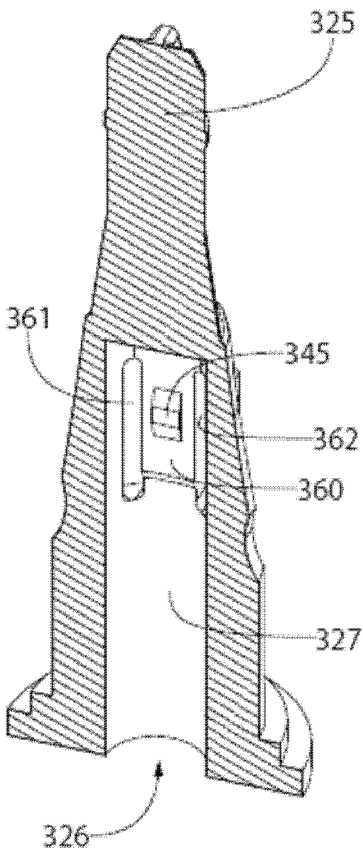
FIG. 8 is a cross-sectional view taken along line VIII-VIII of FIG. 7.

Referring to FIGS. 7 and 8, the engagement protuberance 345 is located on a flexible portion 360 of the inner sidewall 327. Specifically, as best seen in FIGS. 7 and 8 (but also shown in FIG. 3A), there is a first axially elongated slot 361 and a second axially elongated slot 362 located along the second planar section 340 of the inner sidewall 327. The first and second axially elongated slots 361, 362 are circumferentially spaced apart from one another but transversely aligned with one another. Thus, the circumferential portion of the inner sidewall 327 located between the first and second elongated slots 361, 362 is referred to herein as the flexible portion 360 of the inner sidewall 327. This is because the flexible portion 360 of the inner sidewall 327 is capable of flexing inwardly towards the connection cavity 326 and outwardly away from the connection cavity 326 in response to radial forces being applied thereon. Thus, if a force is applied pushing the flexible portion 360 of the inner sidewall 327 towards the connection cavity 326 then it will flex inwardly and if a force is applied pushing the flexible portion 360 of the inner sidewall 327 away from the connection cavity 326 then it will flex outwardly. As discussed in greater detail below, when the stem 250 of the handle 200 is inserted into the connection cavity 326, the stem 250 and the engagement protuberance 345 are in forcible contact with one another such that the stem 250 forces the flexible portion 360 of the inner sidewall 327 to flex outwardly while maintaining engagement with the engagement protuberance 345. This creates a very snug and tight fit to hold the stem 250 in place.

Figures 9A, 9B, 9C:
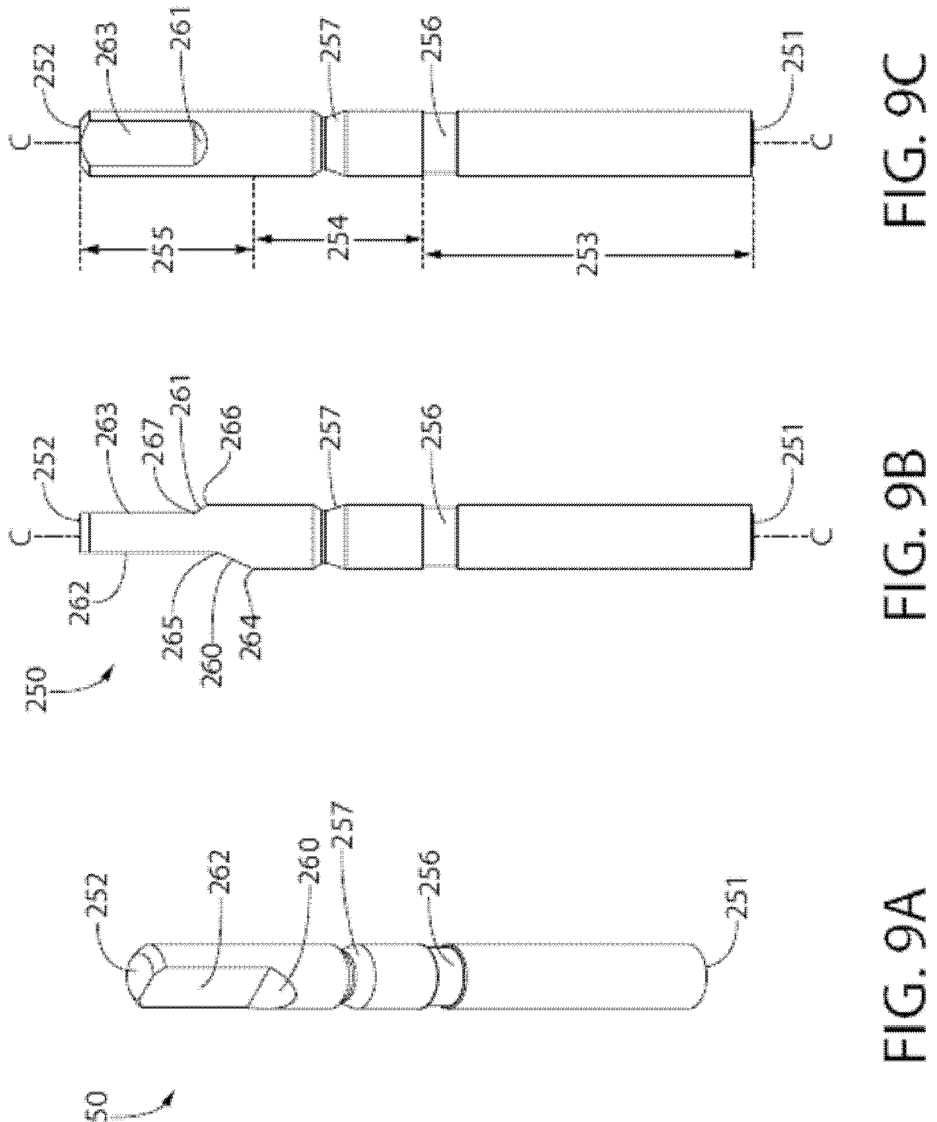
FIGS. 9A-9C are perspective, side, and front views, respectively, of a stem of the handle of the oral care implement of FIG. 1.

Referring to FIGS. 9A-9C, the stem 250 of the handle 200 will be described in greater detail. The stem 250 is illustrated by itself in FIGS. 9A-9C having been removed and separated from the handle 200. The stem 250 extends along a stem axis C-C from a proximal end 251 of the stem 250 to a distal end 252 of the stem 250. When the stem 250 is coupled to the handle 200 as shown in FIG. 2 for example, the stem 250 extends along the stem axis C-C from the distal end surface 211 of the gripping portion 210 of the handle 200 to the distal end 252 of the stem 250.

Referring to FIGS. 9A-9C, 10, and 11, the stem 250 as well as its interaction with various components of the oral care refill head 300 will be described. The stem 250 comprises a proximal stem section 253 that is located within the interior of the gripping section 210 of the handle 200 when the stem 250 is coupled to the handle 200, a base stem section 254, and a distal stem section 255. The proximal stem section 253 may form the drive shaft of the motor 140 in some embodiments. In other embodiments, stem 250 may comprise only the base stem section 254 and the distal stem section 255, which form a distal portion of a drive shaft of the motor 140 with the remainder of the drive shaft of the motor 140 being formed by the proximal stem section 253. The base stem section 254 is located between the proximal stem section 253 and the distal stem section 255. As noted above, the proximal stem section 253 is located within the interior of the handle 200, the base stem section 254 protrudes from and is adjacent to the gripping portion 210 of the handle 200, and the distal stem section 255 extends from the base stem section 254 to the distal end 252. In some embodiments, the stem 250 may comprise only the portions thereof that extend from the distal end surface 211 of the gripping portion 210 of the handle 200 (i.e., the base stem section 254 and the distal stem section 255).

The stem 250 comprises an annular groove 256 located in the proximal stem section 253. The annular groove 256 is configured to mate with a locking member 370 of the handle 200 as shown in FIG. 10. Specifically, the locking member 370 comprises one or more locking arms 371 that nest within the annular groove 256 in the proximal stem section 253 of the stem 250 to couple the stem 250 to the handle 200. The locking arms 371 are configured to flex outwardly as the stem 250 is inserted into the gripping section 210 of the handle 200. However, once the stem 250 is coupled to the handle 200, the engagement between the locking arms 371 and the annular groove 256 prevents the stem 250 from being removed from the handle 200 by simply pulling axially on the stem 250.

The stem 250 also comprises a locking depression 257 located along the base stem section 254 of the stem 250. In the exemplified embodiment, the locking depression 257 is an annular depression 257 that extends around the entire circumference of the stem 250. Thus, the locking depression 257 extends 360 degrees around the stem 250. However, in other embodiments the locking depression 257 may extend along a part but not the entirety of the circumference of the stem 250. In the exemplified embodiment, the locking depression 257 has a V-shaped cross-section, although the invention is not to be so limited in all embodiments and the cross-sectional shape of the locking depression 257 could be modified so long as it is configured to matingly engage the locking protuberance 335 of the radially deflectable arm 330.

Figure 11:
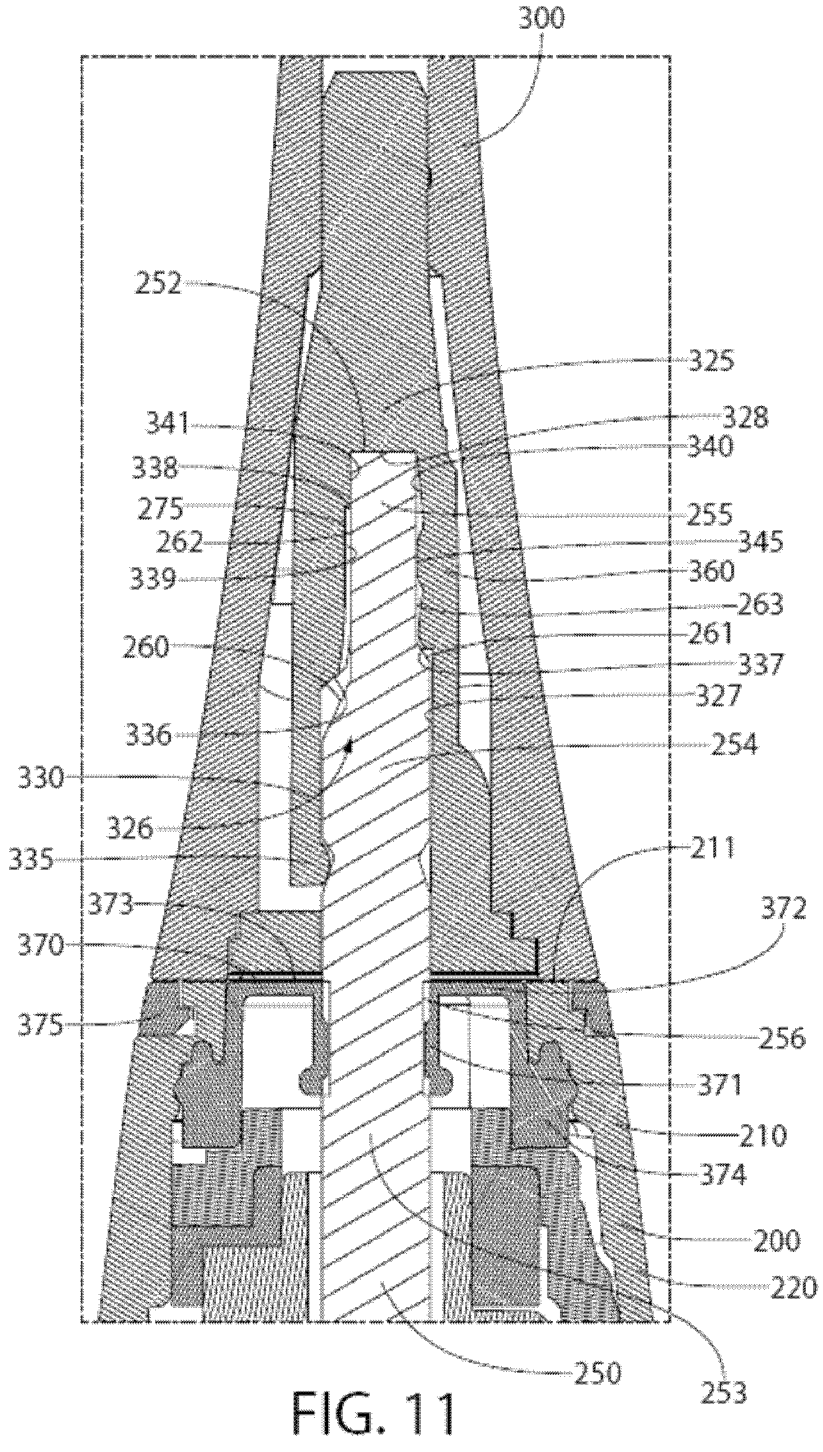
FIG. 11 is a close-up view of area XI of FIG. 10.

FIGS. 10 and 11 illustrate the locking protuberance 335 of the radially deflectable arm 330 nesting within the locking depression 257 in the base stem section 254 of the stem 250. This interaction prevents the oral care refill head 300 from being readily detached from the stem 250 unless a sufficient force is applied onto the oral care refill head 300 relative to the handle 200 to detach the oral care refill head 300 from the handle 200 by removing the locking protuberance 335 from the locking depression 257. During coupling of the oral care refill head 300 to the handle 200, the locking protuberance 335 of the oral care refill head 300 snap fits into the locking depression 257 of the stem 250, thereby achieving the coupling between the oral care refill head 300 and the handle 200. It should be appreciated that the locking depression 257 could be a protuberance and the locking protuberance 330 could be a depression in alternative embodiments.

The distal stem section 255 of the stem 250 comprises a first radial planar shoulder 260 located on a first side of the stem axis C-C and a second radial planar shoulder 261 located on a second side of the stem axis C-C that is opposite the first side of the stem axis C-C. The distal stem section 255 of the stem 250 further comprises a first planar surface 262 extending from the first radial planar shoulder 260 to the distal end 252 and a second planar surface 263 extending from the second radial planar shoulder 261 to the distal end 252. The first planar surface 262 and the first radial planar shoulder 260 are located on a first side of the stem axis C-C and the second planar surface 263 and the second radial planar shoulder 261 are located on a second side of the stem axis C-C. The first and second planar surfaces 262, 263 are oriented substantially parallel to one another and to the stem axis C-C. (the term substantially allowing for a range of plus or minus 5°). In some embodiments, the first and second planar surfaces 262, 263 may be exactly parallel to one another and to the stem axis C-C. The first and second planar surfaces 262, 263 are flat faces on the stem 250 which is otherwise round. Thus, the portions of the outer surface of the stem 250 between the first and second planar surfaces 262, 263 along the distal stem section 255 are round or arcuate.

The first and second radial planar shoulders 260, 261 are aligned along the stem axis C-C. Thus, there is no transverse axis (oriented perpendicular to the stem axis C-C) that would intersect any part of the first radial planar shoulder 260 and also intersect a part of the second radial planar shoulder 261. Rather, the first and second radial planar shoulders 260, 261 are located at entirely different axial heights along the stem 250. Stated another way, the first radial planar shoulder 260 extends from a first end 264 to a second end 265, the first end 264 being closer to the proximal end 251 than the second end 265. The second radial planar shoulder 261 extends from a first end 266 to a second end 267, the first end 266 being closer to the proximal end 251 than the second end 267. The second end 265 of the first radial planar shoulder 260 is located closer to the proximal end 251 of the stem 250 than the first end 266 of the second radial planar shoulder 261 (or, the first end 266 of the second radial planar shoulder 261 is located closer to the distal end 252 of the stem 250 than the second end 265 of the first radial planar shoulder 260).

Referring to FIGS. 10 and 11, the interaction between the handle 200 and the oral care refill head 300 will be further described. As mentioned above, the stem 250 is securely coupled to the handle 200 via engagement between the locking arms 371 of the locking member 370 of the handle 200 and the annular groove 256 of the stem 250. The base and distal stem sections 254, 255 of the stem 250 protrude from the distal end surface 211 of the gripping portion 210 of the handle 200. When the oral care refill head 300 is placed onto the stem 250 of the handle 200, the radially deflectable arm 330 deflects outwardly until the locking protuberance 335 nests within the locking depression 257. The radially deflectable arm 330 then snaps back inward towards the cavity axis B-B and as the locking depression 257 nests within the locking protuberance 335 the oral care refill head 300 becomes locked to the handle 200 via the stem 250. At this time, the oral care refill head 300 is fully coupled to the handle 200.

In this state, there is a gap 275 between the first planar section 262 of the stem 250 and the first planar section 339 of the inner sidewall 327. There is also a gap between the first radial shoulder 336 of the oral care refill head 300 and the first radial planar shoulder 260 of the stem 250. However, the first planar surface 262 of the stem 260 is in direct surface contact with the third planar section 341 of the inner sidewall 327. That is, the gap 275 exists between a first portion of the first planar surface 262 of the stem 250 and the first planar section 339 of the inner sidewall 327, but a second portion of the first planar surface 262 of the stem 250 is in contact with the third planar section 341 of the inner sidewall 327. A portion of the first planar section 339 of the inner sidewall 327 that is located between the first radial shoulder 336 of the inner sidewall 327 and the inner end wall 328 is spaced apart from and not in contact with the stem 250. This occurs because of the inclusion of the third radial shoulder 341 as discussed above. Specifically, the third radial shoulder 341 creates a pocket-like area along the first planar section 339 of the inner sidewall 327 such that the first planar section 339 cannot contact the first planar surface 262 of the stem 250 when the third planar section 341 of the inner sidewall 327 is in contact with the first planar surface 262 of the stem 250.

Furthermore, the second planar surface 263 of the stem 250 may be in contact with the second planar section 340 of the inner sidewall 327. However, it is possible that there may not be contact between the second planar surface 263 of the stem 250 and the second planar section 340 of the inner sidewall 327. Rather, due to the engagement between the engagement protuberance 345 and the second planar surface 263 of the stem 250, the flexible portion 360 of the inner sidewall 327 may flex outwardly so that there is no direct contact between the second planar surface 263 of the stem 250 and the second planar section 340 of the inner sidewall 327. However, the engagement protuberance 345 will be pressed forcibly against the second planar surface 263 of the stem 250, thereby pressing the first planar surface 262 of the stem 250 into contact with the third planar section 341 of the inner sidewall 327. The engagement protuberance 345 is located on the opposite side of the cavity axis B-B than the locking protuberance 335.

As can be seen in FIG. 11, the distal end 252 of the stem 250 is in contact with the inner end wall 328 of the connection cavity 326. That is, there is no space or gap between the distal end 252 of the stem 250 and the inner end wall 328 of the connection cavity 326 in the exemplified embodiment. This again ensures a tight fit between the stem 250 and the oral care refill head 300 and ensures that vibrations generated by the stem 250 will be transmitted to the oral care refill head 300 and the tooth cleaning elements 314.

The locking member 370 has a top portion 372 and the locking arms 371 extend downwardly from the top portion 372. An upper surface 373 of the top portion 372 forms a portion of the distal end surface 211 of the gripping portion 210. The locking arms 371 form an inner annular wall of the locking member 370 and the locking member 370 also includes an outer annular wall 374 that extends downwardly from the top portion 372 and engages the gripping portion 210 of the handle 200. The handle 200 also comprises a seal member 375 that surrounds a distal portion of the gripping portion 210 of the handle 200 as best shown in FIG. 11. As seen in FIG. 10, when the oral care refill head 300 is coupled to the handle 200, the radially deflectable arm 330 is on the same side of the cavity axis B-B and the longitudinal axis A-A of the attachment portion 320 of the oral care refill head 300 as the cleaning portions of the tooth cleaning elements 314 which extend from the front surface 312 of the oral treatment tool 311.

Figure 12:
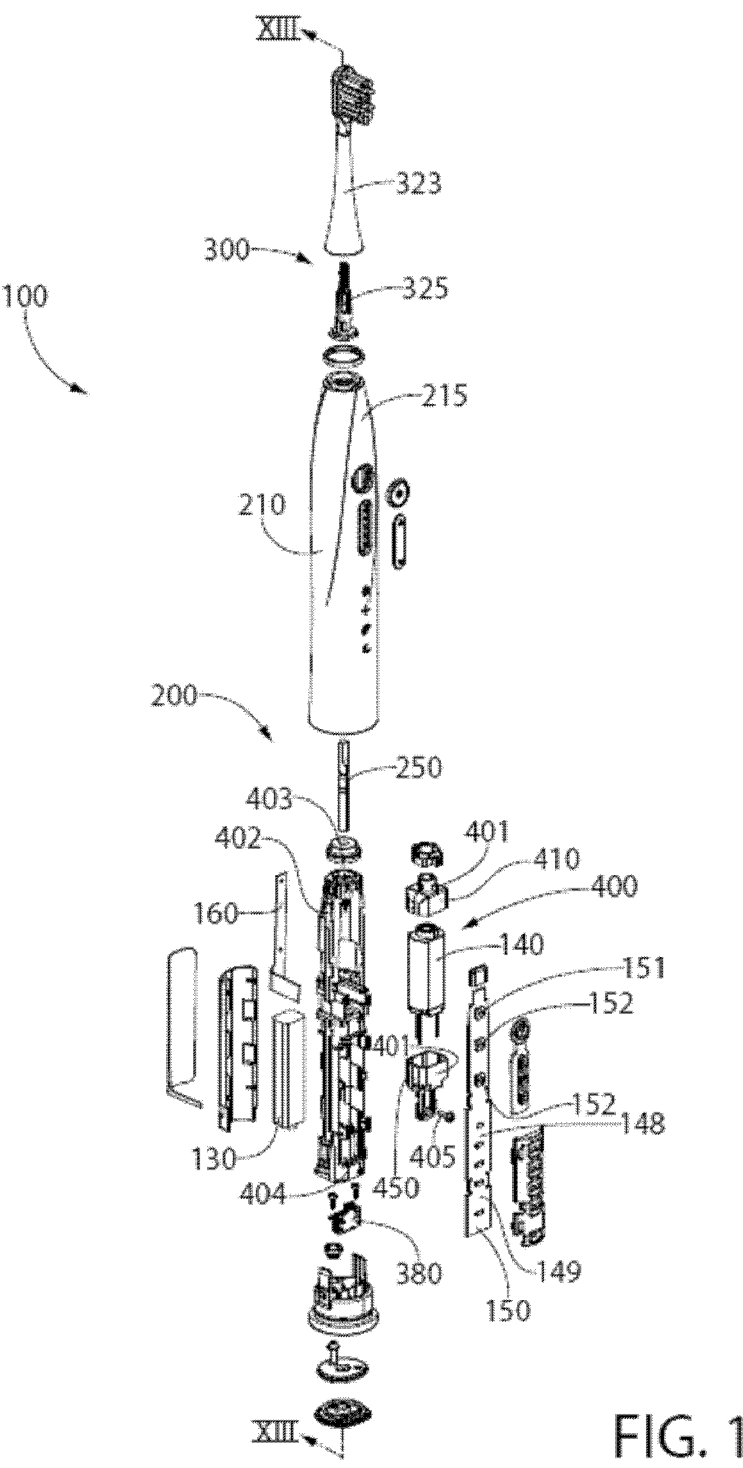
FIG. 12 is an exploded view of the oral care implement of FIG. 1.
Figure 13:
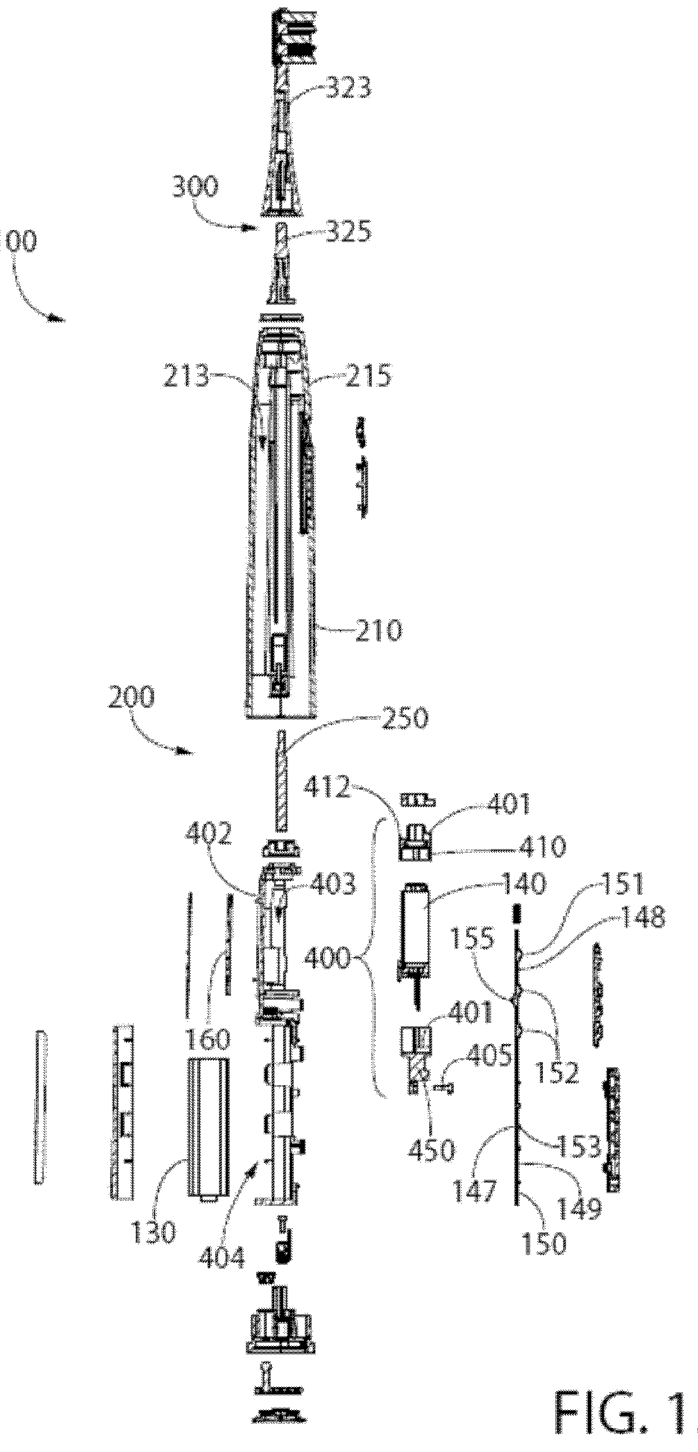
FIG. 13 is a cross-sectional view taken along line XIII-XIII of FIG. 12.
Figure 15:
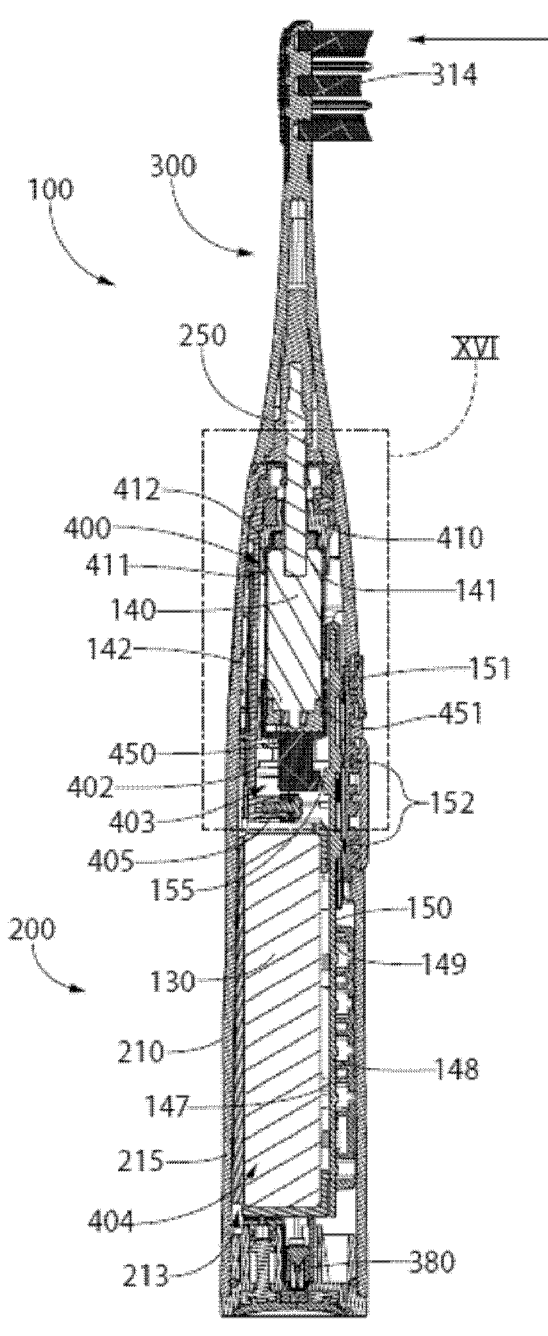
FIG. 15 is a cross-sectional view taken along line XV-XV of FIG. 1 with the rocker unit in a normal position.

Referring to FIGS. 12, 13, and 15, exploded views in perspective and cross-section as well as an assembled cross-sectional view, respectively, are provided and will be described collectively. As discussed above, the oral care implement 100 comprises the oral care refill head 300 which is detachably coupled to the handle 200 by engagement between the insert coupler 325 of the oral care refill head 300 and the stem 250 of the handle 200. The handle 200 includes the gripping portion 210 which is a plastic housing that houses the remaining components of the handle 200. Specifically, the gripping portion 210 of the handle 200 comprises a housing 215 having an internal cavity or chamber 213 within which the remaining components of the handle 200 are located. In that regard, the control unit 150, the power source 130, and the motor 140 are disposed within the internal chamber 213 of the housing 215 of the gripping portion 210 of the handle 200.

Furthermore, the handle 200 comprises a rocker unit 400 that is at least partially mounted within the internal chamber 213 of the gripping portion 210 of the handle 200. In the exemplified embodiment, the rocker unit 400 comprises the stem 250, the motor 140, and a motor chassis 401 that supports the motor 140. The motor chassis 401 forms a sleeve around at least a portion of the motor 140 as shown, for example, in FIGS. 15 and 16 and described in greater detail below. As will be described below, portions of the rocker unit 400, and specifically the motor 140 and the motor chassis 401, are mounted within the internal chamber 213 of the gripping portion 210 of the handle 200 so as to be rockable relative to the housing 215 of the gripping portion 210 about a fulcrum. The stem 250 may also rock (or pivot) relative to the housing 215 in response to forces/pressures acting thereon as described more fully herein below.

The motor chassis 401 comprises an upper portion 410 and a lower portion 450. The upper portion 410 of the motor chassis 401 forms an upper sleeve 411 within which a top portion 141 of the motor 140 nests. The lower portion 450 of the motor chassis 401 forms a lower sleeve 451 within which a bottom portion 142 of the motor 140 nests. In the exemplified embodiment, the motor chassis 401 does not cover or surround the entirety of the motor 140. Rather, a middle portion of the motor 140 located between the top and bottom portions 141, 142 of the motor 140 is not surrounded or otherwise covered by the motor chassis 401. However, in other embodiments the motor chassis 410 could cover or surround the entirety of the motor 140. Furthermore, rather than having upper and lower portions 410, 450 which are separate components, in other embodiments the motor chassis 401 could comprise a singular housing or sleeve that surrounds a portion of or the entirety of the motor 140.

As noted above, the rocker unit 400 is mounted in such a way that it is rockable relative to the housing 215 about a fulcrum and this rocking motion will be described in greater detail below with reference to FIGS. 15-18. In the exemplified embodiment, the fulcrum is formed by a protrusion 412 extending from the upper portion 410 of the motor chassis 401 (the protrusion 412 can be seen more clearly in FIG. 16). Specifically, the protrusion 412 is an elongated ridge-like protrusion that extends from an outer surface of the upper portion 410 of the motor chassis 401. Thus, as excessive pressure is applied onto the tooth cleaning elements 314 during use, the oral care refill head 300 causes the stem 250 to pivot, which in turn causes the motor 140 and the upper portion 410 of the motor chassis 401 to pivot/rock about the fulcrum or protrusion 412. As the upper portion 410 of the motor chassis 401 pivots/rocks about the protrusion 412, the lower portion 450 of the motor chassis 401 also pivots/rocks so as to actuate a pressure actuator element 155 as described in greater detail below. In response to excessive pressure on the tooth cleaning elements 314, the upper portion 410 of the motor chassis 401 may rock in a first direction and the lower portion 450 of the motor chassis 401 may rock in a second direction that is opposite the first direction. The first direction may be a direction opposite the direction that the tooth cleaning elements 314 extend from the head and the second direction may be the same direction as that which the tooth cleaning elements 314 extend from the head, or vice versa.

In addition to the motor chassis 401, in the exemplified embodiment the oral care implement 100 comprises a support chassis 402. The support chassis 402 comprises an upper chamber 403 within which the motor 140 and the motor chassis 401 nest and a lower chamber 404 within which the power source 130 nests. The support chassis 402 is also housed within the internal chamber 213 of the housing 215 of the gripping portion 210 of the handle 200. The support chassis 402 is fixed within the internal chamber 213 of the housing 210 in the exemplified embodiment. Furthermore, as shown in FIG. 15 and described in more detail below, the lower portion 450 of the motor chassis 401 is fixedly coupled to the support chassis 402 with a fastener 405. The lower portion 450 of the motor chassis 401 could alternatively be fixedly coupled directly to the housing 410 with a fastener in other embodiments.

As noted above, the oral care implement 100 also comprises a control unit 150 that is located within the internal chamber 213 of the gripping portion 210 of the handle 200. The control unit 150 comprises the printed circuit board 149 which has a first surface 148 and an opposite second surface 147. The power actuator 151 and the intensity actuator 152 are located on the first surface 148 of the printed circuit board 149. Furthermore, the control unit 150 comprises the pressure actuator element 155 located on the second surface 147 of the printed circuit board 149. The pressure actuator element 155 is actuated when a user is applying too much pressure onto the oral care refill head 300 during use of the oral care implement 100 for tooth cleaning or other oral or personal hygiene activities and the details of this operation will be described in greater detail below. The oral care implement 100 also comprises a pressure actuated light source 380 that is operably coupled to the control unit 150. Upon actuation of the pressure actuator element 155 as mentioned above and described in greater detail below, the control circuit 150 may be configured to illuminate the pressure actuated light source 380.

Figure 16:
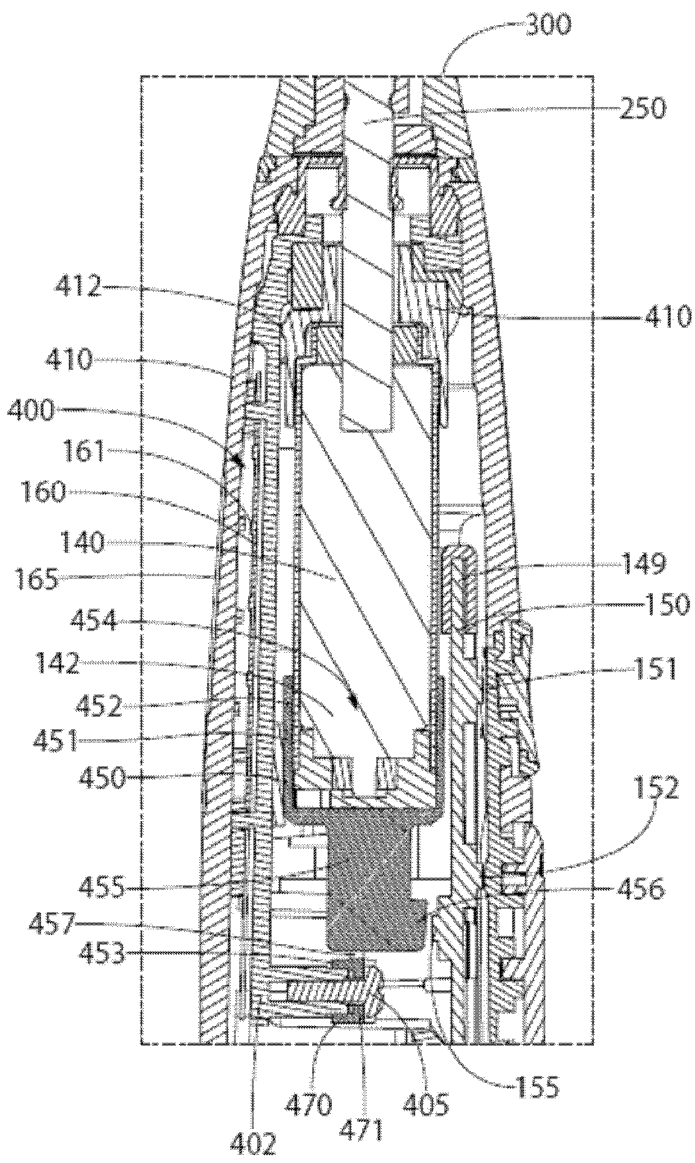
FIG. 16 is a close-up view of area XVI of FIG. 15.

Referring briefly to FIGS. 12 and 16, the control unit 150 also comprises a second printed circuit board 160 comprising a plurality of light sources 161. The control unit 150 is configured to illuminate one or more of the light sources 161 to indicate an intensity of the motor 140 to the user. Specifically, as noted above the user can adjust the intensity of the motor using the intensity button 202 which will actuate the intensity actuator 152 on the printed circuit board 149 of the control unit 150. Furthermore, in response to the intensity actuator 152 being actuated (either upward or downward), the control circuit 150 will either activate or deactivate one or more of the light sources 161 on the second printed circuit board 160. The light emitted by the light sources 161 may be seen through a transparent window 165 on a rear of the handle 200.

Additional components of the oral care implement 100 are shown in FIGS. 12, 13, and 15 but not described herein. It should be understood that such additional components may comprise gaskets, end caps, covers, structural parts, elastomeric seals, or the like that may serve a purpose in rendering the housing 210 fluid-tight so that fluid cannot destroy the internal electronic components and in ensuring proper functionality and operation of the oral care implement 100 in accordance with the teachings set forth herein.

Figure 14A:
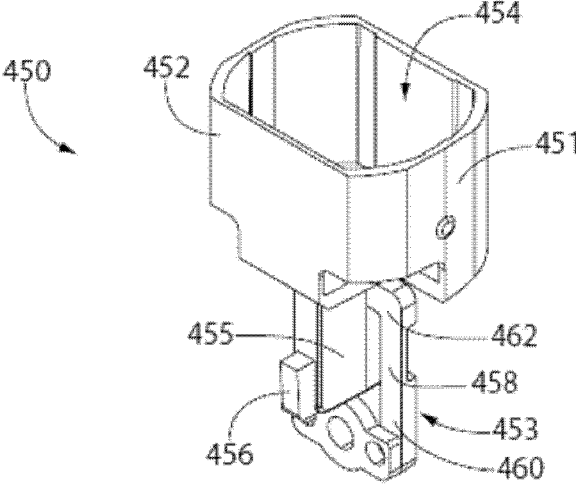
FIGS. 14A and 14B are perspective and front views, respectively, of a lower portion of a motor chassis of a rocker unit in accordance with an embodiment of the present invention.
Figure 14B:
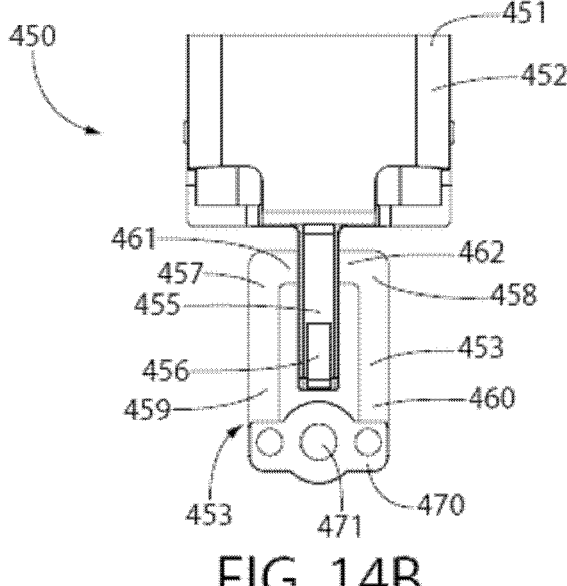

Referring to FIGS. 14A, 14B, and 16, the lower portion 450 of the motor chassis 401 will be described in greater detail. The lower portion 450 of the motor chassis 401 comprises a first section 452 and a second section 453 that is coupled to the first section 452. The first section 452 of the lower portion 450 of the motor chassis 401 comprises the lower sleeve 451 and an actuator arm 455 comprising a contact element 456. The actuator arm 455 extends downwardly from a bottom end of the lower sleeve 451 and is integral with and fixed to the lower sleeve 451. The lower sleeve 451 of the first section 452 of the lower portion 450 of the motor chassis 401 defines a cavity 454 within which the bottom portion 142 of the motor 140 nests. The second section 453 of the lower portion 450 of the motor chassis 401 is integrally formed with the first section 452 such that the first and second sections 452, 453 form a monolithic component.

In the exemplified embodiment, the second section 453 of the lower portion 450 of the motor chassis 401 comprises a first strut 457 and a second strut 458 that are coupled to the actuator arm 455 of the first section 452. Specifically, each of the first and second struts 457, 458 comprises a vertical portion 459, 460 that is spaced apart from the actuator arm 455 and a horizontal portion 461, 462 that extends from a top end of the vertical portion 459, 460 to the actuator arm 455 such that a terminal end of the horizontal portion 461, 462 is coupled to the actuator arm 455. The struts 457, 458 form the only connection or coupling between the first and second sections 452, 453 of the lower portion 450 of the motor chassis 401. This connection between the first and second sections 452, 453 allows for the first section 452 of the lower portion 450 to pivot relative to the second section 453 of the lower portion 450. While the first and second struts 457, 458 are used to couple the first and second sections 452, 453 of the lower portion 450 together in the exemplified embodiment, the invention is not to be so limited in all embodiments. In other embodiments, the first and second sections 452, 453 of the lower portion 450 of the motor chassis 401 may be coupled together via one or more flexible struts, a living hinge, a thinned section, or combinations thereof that will still permit the first section 452 to pivot, rock, or otherwise move relative to the second section 453 as described herein.

The second section 453 of the lower portion 450 of the motor chassis 401 also comprises a connection portion 470. Specifically, the connection portion 470 extends from a bottom end of the vertical portion 459 of the first strut 457 to a bottom end of the vertical portion 460 of the second strut 458. The connection portion 470 is spaced from a distal end of the actuator arm 455 by a gap, which ensures that the actuator arm 455 (along with the lower sleeve 451) can pivot relative to the first and second struts 457, 458 and the connection portion 470. Thus, there is a U-shaped gap between the actuator arm 455 of the first section 452 and the second section 453 which enables the actuator arm 455 to flex, pivot, rotate, or the like relative to the second section 453. The connection portion 470 comprises a connection feature 471 that facilitates connecting the connection portion 470 directly to the support chassis 402 or to the housing 210. In the exemplified embodiment, the connection feature 471 is an aperture that is configured to receive the fastener 405 mentioned above. However, the invention is not to be so limited and in other embodiments the connection feature 471 could comprise a protrusion that is received in a recess of the support chassis 402 or the housing 210 to couple the second section 453 of the lower portion 450 of the motor chassis 401 to the support chassis 402 or to the housing 210.

As shown in FIGS. 15 and 16 and as discussed above, in the exemplified embodiment the connection portion 470 of the second section 453 of the lower portion 450 of the motor chassis 401 is coupled directly to the support chassis 402. Specifically, the fastener 405 extends through the connection feature 471 (i.e., aperture) in the connection portion 470 of the second section 453 of the lower portion 450 of the motor chassis 401 and into an aperture or recess in the support chassis 402. As a result, the second section 453 is fixedly secured to the support chassis 402. Of course, in other embodiments the second section 453 could be fixedly secured directly to the housing 215 of the gripping portion 210 of the handle 200 by having the fastener 405 extend into an aperture in the housing 215 rather than an aperture in the support chassis 402. However, the same result is achieved which is that the second section 453 of the lower portion 450 of the motor chassis 401 is fixedly coupled to the housing 210 such that the second section 453 of the lower portion 450 of the motor chassis 401 does not move relative to the housing 210. Fastening the second section 453 of the lower portion 450 of the motor chassis 401 to the support chassis 402 or to the housing 215 stabilizes the motor, and the structure of the lower portion 450 of the motor chassis 401 still enables the rocking/pivoting motion needed to actuate the pressure actuator element 155 as described herein.

However, the first section 452 of the lower section 450 of the motor chassis 402 is configured to pivot or otherwise move or bend relative to the second section 453 of the motor chassis 402 and relative to the housing 210. Specifically, because the second section 453 is only coupled to the first section 452 via the struts 457, 458, there is some degree of flexibility in the connection between the first and second sections 452, 453. Furthermore, the first section 452 is not directly coupled to the housing 210 or to the support chassis 402, but is only coupled thereto indirectly via the second section 453. Thus, a force being applied onto the first section 452 will permit the first section 452 to pivot or rock relative to the second section 453 and relative to the support chassis 402 and to the handle 200, and this may be done to actuate the pressure actuator element 155 as described in greater detail below.

FIGS. 15 and 16 illustrate the oral care implement 100 with the rocker unit 400 in a normal position. The normal position is a position whereby either no pressure is being applied onto the tooth cleaning elements 314 or a pressure that is below a threshold required to cause the rocker unit 400 to rock relative to the housing 210 about the fulcrum is being applied onto the tooth cleaning elements 314. Thus, the rocker unit 400 is only configured to rock about the fulcrum when an excessive pressure is being used during brushing or otherwise when a force greater than a threshold is being applied onto the tooth cleaning elements 314 in the direction of the arrow labeled F in FIG. 15. Thus, the normal state includes a non-use state and a state of use whereby excessive brushing pressure is not being used and an excessive force above a threshold is not being applied onto the tooth cleaning elements 314. The rocker unit 400 is therefore biased into the normal position.

In the exemplified embodiment, when the rocker unit 400 is in the normal position, the contact element 456 of the rocker unit 400 (located on the actuator arm 455 of the first section 452 of the lower portion 450 of the motor chassis 401) is spaced apart from the pressure actuator element 155 of the control unit 150 such that the contact element 456 is not actuating the pressure actuator element 155. Of course, the invention is not to be limited to this configuration in all embodiments. For example, in some embodiments the pressure actuator element 155 may be a trigger switch or a depressible switch. In such embodiments, in the normal position the contact element 456 may be in contact with the pressure actuator element 155 of the control unit 150 without depressing or otherwise actuating the pressure actuator element 155. Thus, there need not be a gap between the contact element 456 of the rocker unit 400 and the pressure actuator element 155 of the control unit 150 for the pressure actuator element 155 to be in a non-activated state. Either way, in the exemplified embodiment when the rocker unit 400 is in the normal position, the contact element 456 of the rocker unit 400 does not actuate the pressure actuator element 155. Thus, unless an excessive force beyond a predetermined threshold (an excessive brushing pressure or the like) is being applied onto the tooth cleaning elements 314, the pressure actuator element 155 is not actuated.

Figure 17:
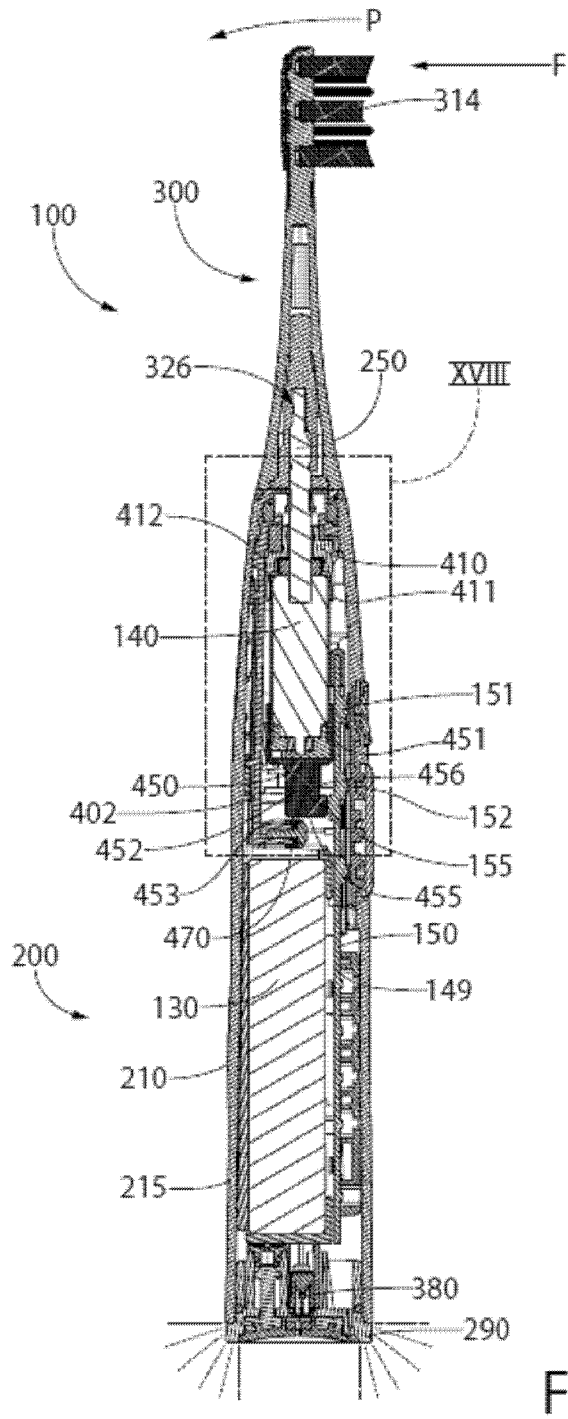
FIG. 17 is a cross sectional view taken along line XV-XV of FIG. 1 with the rocker unit in an excessive-pressure position.
Figure 18:
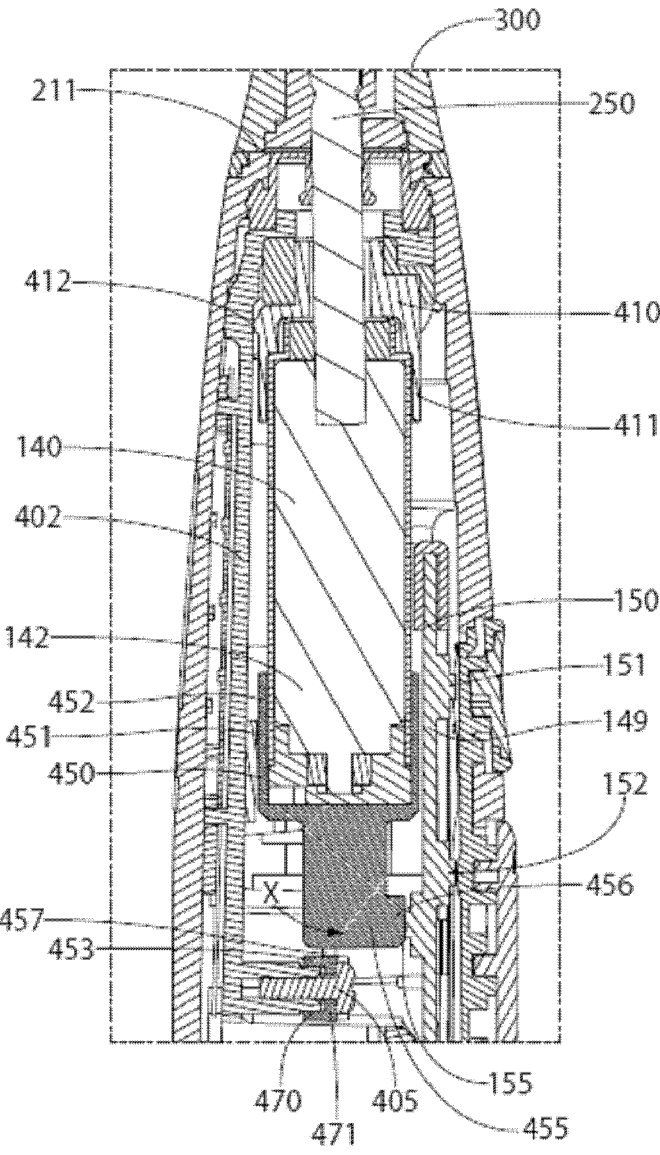
FIG. 18 is a close-up view of area XVIII of FIG. 17.

Referring to FIGS. 17 and 18, the force F is being applied onto the tooth cleaning elements 314 with a pressure that exceeds a threshold. As a result, the rocker unit 400 has been altered from the normal position that was shown in FIGS. 15 and 16 to an excessive-pressure position. A description of how the force F is imparted onto the rocker unit 400 is described here. First, the force F is applied onto the tooth cleaning elements 314, which causes the oral care refill head 300 to pivot rearward in the directly of the arrow P. Because the stem 250 of the rocker unit 400 is fit snugly within the connection cavity 236 of the oral care refill head 300, the pivoting of the oral care refill head 300 in the direction of the arrow P causes the stem 250 to also pivot in the direction of the arrow P. As the stem 250 pivots in the direction of the arrow P, so too does the motor 140 because it is coupled to the stem 250. As the motor pivots 140, the upper portion 410 of the motor chassis 402 rocks about the protrusion 412, which forms the fulcrum of the rocker unit 400 as described herein.

As the motor 140 and the upper portion 410 of the motor chassis 402 pivot, the bottom portion 142 of the motor 140 pivots to the right in the view shown in FIGS. 17 and 18 in the direction of the arrow labeled X. As the bottom portion 142 of the motor 140 pivots, the first section 452 of the lower portion 450 of the motor chassis 401 which surrounds the bottom portion 142 of the motor 140 also pivots or flexes or bends or rocks in the direction of the arrow X, which is a direction opposite the direction of the force F.

As discussed above, the second section 453 of the lower portion 450 of the motor chassis 401 does not pivot because it is fixedly coupled to the housing 210 (directly or indirectly via the support chassis 402). Thus, the first section 452 of the lower portion 450 of the motor chassis 401 pivots relative to the second section 453 of the lower portion 450 of the motor chassis 401 and also relative to the housing 215 of the handle 200. In that regard, the pressure being applied onto the tooth cleaning elements 314 must have a force (i.e., the force F) with a strength or magnitude that is sufficient to cause the first section 452 of the lower portion 450 of the motor chassis 401 to pivot relative to the second section 453 of the lower portion 450 of the motor chassis 401. As discussed above, the lower portion 450 of the motor chassis 450 is an integral, monolithic component and thus the first section 452 of the motor chassis 401 will not pivot relative to the second section 453 of the motor chassis 401 without a particular magnitude of force being applied. The lower portion 450 of the motor chassis 410 is formed from plastic such as polypropylene in the exemplified embodiment but it may be formed from other plastics or even thin metals in other embodiments without detracting from the function described herein.

In the exemplified embodiment, as the force F is applied onto the tooth cleaning elements 314, the first section 452 of the lower portion 450 of the motor chassis 401 pivots so that the contact element 456 on the actuator arm 455 contacts the pressure actuator element 155. In the exemplified embodiment, upon the contact element 456 contacting the pressure actuator element 155, the pressure actuator element 155 is actuated. As noted above, in other embodiments the force F may cause the contact element 456 on the actuator arm 455 to actuate the pressure actuator element 155 by depressing it rather than simply closing a gap and coming into contact with it. Either way, the force F applied to the tooth cleaning elements 314 causes the rocker unit 400 to alter from the normal state shown in FIGS. 15 and 16 into the excessive-pressure state shown in FIGS. 17 and 18. In the excessive-pressure state shown in FIGS. 17 and 18, the contact element 156 of the rocker unit 400 actuates the pressure actuator element 155 of the control unit 150.

As seen in FIG. 18, the fulcrum upon which the rocker unit 400 rocks is the protrusion 412 on the upper portion 410 of the motor chassis 401. Thus, the fulcrum is located above a top edge of the motor 140 and between the motor 140 and the distal end 211 of the gripping portion 210 of the handle 200. The contact element 456 of the rocker unit 400 which actuates the pressure actuator element 155 is located below a bottom end of the motor 140, or between the bottom end of the motor 140 and the power source 130. Thus, the entire motor 140 is located axially between the contact element 456 of the rocker unit 400 and the fulcrum (i.e., the protrusion 412) of the rocker unit 400. The motor 140 forms a part of the rocker unit 400 such that the motor 140 actually rocks or pivots as the rocker unit 400 is being altered between the normal and excessive-pressure positions.

When the contact element 156 of the rocker unit 400 actuates the pressure actuator element 155 of the control unit 150, the control unit initiates generation of a user perceptible signal. In the exemplified embodiment, the user perceptible signal is the activation of the light source 380 to generate and emit light. In the exemplified embodiment, a lower annular ring portion 290 of the handle 200 is transparent or translucent or otherwise light transmissive so that light emitted by the light source 380 is emitted through the lower annular ring portion 290 of the handle 200 where it can be seen by a user of the oral care implement. Thus, upon seeing light emitted through the lower annular ring portion 290 of the handle 200, the user will know that he/she is brushing with too much force and that he/she should adjust his/her brushing technique. In other embodiments, the light source may be positioned at other locations within the handle 200. For example, activation of the pressure actuator element 155 may cause the control unit 150 to activate a light source located along a rear of the handle 200 to emit light through the rear of the handle 200. In other embodiments, activation of the pressure actuator element 155 may cause the control unit 150 to activate a light source located along a front of the handle 200 or at any other location along the oral care implement 100 to emit light therefrom that can be seen by a user. The activation of the light source 380 provides an indication to a user of excessive brushing pressure that can then be remedied by the user.

Although activation of the pressure actuator element 155 causes the control unit 150 to activate a light source in the exemplified embodiment, in other embodiments different user perceptible signals may be generated upon activation of the pressure actuator element 155. For example, the oral care implement may comprise a sound emission device (such as a speaker) and activation of the pressure actuator element 155 may cause the control unit 150 to activate the sound emission device to generate a sound that can be heard by the user. In still other embodiments, upon activation of the pressure actuator element 155, the control unit 150 may alter an operating characteristic of the motor 140 by either abruptly stopping operation of the motor 140, slowing down the speed of the motor 140, increasing the speed of the motor 140, pulsing the motor 140, or the like. Thus, this may form a haptic user perceptible indicator or signal. In some embodiments, activation of the pressure actuator element 155 may cause the control unit 150 to both activate the light source 380 and alter an operating characteristic of the motor 140.

Upon a user reducing the force F being applied onto the tooth cleaning elements 314 to a magnitude that is below the predetermined threshold, the rocker unit 400 will be altered back from the excessive-pressure position into the normal position. This is because, as noted above, the rocker unit 400 is biased into the normal position. Thus, user force is required to alter the rocker unit 400 from the normal position into the excessive-pressure position, and upon cessation of the force the rocker unit 400 will automatically alter from the excessive-pressure position back to the normal position. In altering from the excessive-pressure position to the normal position, the rocker unit 400 will no longer actuate the pressure actuator element 155 and the control unit 150 will stop the generation of the user perceptible signal. The strength of the connection between the first and second sections 452, 453 of the lower portion 450 of the motor chassis 402 will dictate the predetermined threshold. This can be achieved by altering the thickness of the first and second struts 457, 458, altering the material of construction for the lower portion 450 of the motor chassis 402, or the like.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An oral care implement comprising:
   a gripping portion having a distal end surface; and
   a stem extending from the distal end surface of the gripping portion, the stem extending along a stem axis from the distal end surface to a distal end of the stem, the stem comprising:
     a base stem section adjacent the distal end surface of the gripping portion and comprising a locking depression; and
     a distal stem section comprising a first planar surface and a second planar surface opposite the first planar surface, the first and second planar surfaces being substantially parallel to one another and to the stem axis, the distal stem section further comprising a first radial planar shoulder and a second radial planar shoulder, the first radial planar shoulder located closer to the distal end surface of the gripping portion than the second radial planar shoulder; and
   an oral care refill head detachably coupled to the stem, the oral care refill head comprising:
     a head portion comprising an oral care treatment tool; and
     an attachment portion extending along a longitudinal axis from a proximal end to a distal end, the head portion located at the distal end of the attachment portion, the attachment portion comprising:
       a connection cavity defined by an inner sidewall and an inner end wall of the attachment portion, the connection cavity extending along a cavity axis from an opening in the proximal end of the attachment portion to the inner end wall of the attachment portion, the connection cavity configured to receive the stem;
       a locking protuberance located at a first axial distance from the proximal end of the attachment portion, the locking protuberance protruding from the inner sidewall into the connection cavity and configured to engage the locking depression of the stem;
       a first radial shoulder formed in the inner sidewall and located a second axial distance from the proximal end of the attachment portion, the first radial shoulder circumferentially aligned with the locking protuberance and the second axial distance being greater than the first axial distance;
       a second radial shoulder formed in the inner sidewall and located on an opposite side of the inner sidewall than the first radial shoulder, the second radial shoulder located a third axial distance from the proximal end of the attachment portion that is greater than the second axial distance; and
       a third radial shoulder circumferentially aligned with the first radial shoulder and located a fourth axial distance from the proximal end of the attachment portion that is greater than the third axial distance;

wherein the inner sidewall further comprises:

a first planar section located between the first radial shoulder and the inner end wall;

a second planar section located between the second radial shoulder and the inner end wall; and a third planar section extending from the third radial shoulder to the inner end wall, the third planar section configured to contact a distal stem section of the stem; and wherein, when the stem is received within the connection cavity, a gap exists between a first portion of the first planar surface of the stem and the first planar section of the inner sidewall, and a second portion of the first planar surface of the stem is in contact with the third planar section of the inner sidewall.

2. The oral care implement according to claim 1 comprising: wherein the attachment portion further comprises:

an outer sleeve portion comprising a central cavity; and an insert coupler fixed within the central cavity, the insert coupler comprising the connection cavity, the inner sidewall, the end wall, the locking protuberance, and the first and second radial shoulders;

the insert coupler further comprising the radially deflectable arm formed into the inner sidewall; and the insert coupler fixed within the central cavity of the outer sleeve portion so that a gap exists between an inner surface of the outer sleeve portion and an outer surface of the radially deflectable arm.

3. The oral care implement according to claim 2 further comprising:

the insert coupler further comprising:

an annular ring structure; wherein the through-slot defining the radially deflectable arm, the through-slot separating the distal end of the radially deflectable arm and the annular ring structure;

the outer sleeve portion comprising an annular proximal end surface that is substantially coplanar with and circumscribes an annular proximal end surface of the annular ring structure.

4. The oral care implement according to claim 1 wherein the attachment portion further comprises an engagement protuberance protruding from the inner sidewall, the engagement protuberance circumferentially aligned with the second radial shoulder and located a fifth axial distance from the proximal end of the attachment portion that is greater than the third axial distance, the engagement protuberance configured to engage the stem via a compression fit.

5. The oral care implement according to claim 4 wherein the first planar section is circumferentially aligned with the first radial shoulder; and the second planar section is circumferentially aligned with the second radial shoulder; and the engagement protuberance protrudes from the second planar section of the inner sidewall.

6. The oral care implement according to claim 4 wherein the connection cavity comprises:

a first axial cavity section extending from the proximal end of the attachment portion to the first radial shoulder, the first axial cavity section comprising a first width;

a second axial cavity section extending from the first radial shoulder to the second radial shoulder, the second axial cavity section comprising a second width that is less than the first width;

a third axial cavity section extending from the second radial shoulder to the third radial shoulder, the third axial cavity section comprising a third width that is less than the second width; and a fourth axial cavity section extending from the third radial shoulder to the inner end wall, the fourth axial cavity section comprising a fourth width that is less than the third width; and wherein the first axial cavity section has circular transverse cross-sectional profile.

7. The oral care implement according to claim 4 further comprising a first elongated slot extending through the inner sidewall on a first side of the engagement protuberance a second elongated slot extending through the inner sidewall on a second side of the engagement protuberance, a portion of the inner sidewall positioned between the first and second elongated slots being radially flexible, and wherein the engagement protuberance is located on the portion of the inner sidewall, the flexible portion of the inner sidewall configured to flex radially outwardly away from the connection cavity when the engagement protuberance engages the stem.

8. The oral care implement according to claim 4 wherein the engagement protuberance is located on an opposite side of the cavity axis than the locking protuberance.

9. The oral care implement according to claim 4 wherein the engagement protuberance is pressed against the second planar surface of the stem, thereby pressing the first planar surface of the stem into contact with the third planar section of the inner sidewall.

10. The oral care implement according to claim 1 wherein the first radial shoulder is at a first oblique angle relative to the cavity axis and second radial shoulder is at a second oblique angle relative to the cavity axis, the first and second oblique angles being different than one another.

11. The oral care implement according to claim 1 wherein the first radial shoulder has a radial width that is greater than a radial width of the second radial shoulder.

12. The oral care implement according to claim 1 wherein the handle further comprises:

a gripping portion housing a motor and a power source, the motor operably coupled to the stem to impart movement to the stem; and the stem protruding from a distal end surface of the gripping portion, the oral care refill head detachably coupled to the stem so that the movement of the stem is imparted to the head portion of the oral care refill head.

13. The oral care implement according to claim 1 wherein, when the stem is received within the connection cavity, the distal end of the stem is in contact with the inner end wall of the connection cavity.

14. The oral care implement according to claim 1 wherein the locking depression is an annular depression extending around an entire circumference of the stem.

15. The oral care implement according to claim 1 wherein the locking depression has a V-shaped cross-section.

16. The oral care implement according to claim 1 wherein the first and second radial planar shoulders of the distal stem section are not transversely aligned with one another.

* * * * *